(12) United States Patent
Nagaya et al.

(10) Patent No.: US 12,466,850 B2
(45) Date of Patent: Nov. 11, 2025

(54) METHOD FOR PRODUCING PEPTIDE COMPOUND

(71) Applicant: NISSAN CHEMICAL CORPORATION, Tokyo (JP)

(72) Inventors: Akihiro Nagaya, Funabashi (JP); Michiharu Handa, Funabashi (JP); Yuji Mimori, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 863 days.

(21) Appl. No.: 17/639,217

(22) PCT Filed: Aug. 27, 2020

(86) PCT No.: PCT/JP2020/032343
§ 371 (c)(1),
(2) Date: Feb. 28, 2022

(87) PCT Pub. No.: WO2021/039901
PCT Pub. Date: Mar. 4, 2021

(65) Prior Publication Data
US 2022/0306682 A1 Sep. 29, 2022

(30) Foreign Application Priority Data
Aug. 30, 2019 (JP) .................. 2019-158350

(51) Int. Cl.
*C07K 1/06* (2006.01)
*C07F 7/08* (2006.01)

(52) U.S. Cl.
CPC .............. *C07K 1/062* (2013.01); *C07F 7/081* (2013.01)

(58) Field of Classification Search
None
See application file for complete search history.

(56) References Cited

U.S. PATENT DOCUMENTS

| | | | | |
|---|---|---|---|---|
| 11,993,629 | B2 * | 5/2024 | Handa | ............... C07K 1/088 |
| 2003/0018164 | A1 * | 1/2003 | Eggen | ............... C07K 1/02 |
| | | | | 530/338 |
| 2012/0059149 | A1 | 3/2012 | Takahashi et al. | |
| 2013/0345423 | A1 * | 12/2013 | Kershen | ............... A61P 35/00 |
| | | | | 560/163 |
| 2019/0023726 | A1 | 1/2019 | Yano et al. | |
| 2020/0291061 | A1 * | 9/2020 | Nagaya | ............... C07K 5/0812 |

FOREIGN PATENT DOCUMENTS

| | | | |
|---|---|---|---|
| JP | S52-102229 A | 8/1977 | |
| WO | WO-9305065 A1 * | 3/1993 | ............. C07F 7/045 |
| WO | WO-2011134675 A1 * | 11/2011 | ........... A61K 31/704 |
| WO | WO 2012/029794 A1 | 3/2012 | |
| WO | WO 2017/038650 A1 | 3/2017 | |
| WO | WO 2019/069978 A1 | 4/2019 | |

OTHER PUBLICATIONS

IUPAC, Compendium of Chemical Terminology, Gold Book, pp. 75, 193, 1078, and 1160 of 1622 (2014) (Year: 2014).*
Amino Acid—Britannica Online Encyclopedia (Jul. 17, 2009) (Year: 2009).*
Membership of the Commission, 56 Pure & Applied Chemistry, 595-624 (1984) (Year: 1984).*
K. Borsuk et al., 45 Tetrahedron Letters, 3585-3558 (2004) (Year: 2004).*
M. Golkowski et al., 16 Molecules, 4695-4718 (2011) (Year: 2011).*
C. Chen et al., 128 Journal of the American Chemical Society, 13696-13697 (2006) (Year: 2006).*
Borsuk et al., "Application of substituted 2-(trimethylsilyl)ethyl esters to suppress diketopiperazine formation," *Tetrahedron Lett.*, 45: 3585-3588 (2004).
Chao et al., "Synthesis and Application of Bis-Silylethyl-Derived Phosphate-Protected Fmoc-Phosphotyrosine Derivatives for Peptide Synthesis," *J. Org. Chem.*, 59(22): 6687-6691 (1994).
Cheng et al., "Total Synthesis of Anti-tuberculosis Natural Products Ilamycins $E_1$ and F," *Org. Lett.*, 20(19): 6166-6169 (2018).
Liang et al., "Di-tert-butylisobutylsilyl, Another Useful Protecting Group," *Org. Lett.*, 13(15): 4120-4123 (2011).
Japanese Patent Office, International Search Report in International Patent Application No. PCT/JP2020/032343 (Oct. 13, 2020).

* cited by examiner

*Primary Examiner* — Alexander R Pagano
(74) *Attorney, Agent, or Firm* — Leydig, Voit & Mayer, Ltd.

(57) ABSTRACT

The invention provides a method for producing a peptide by (1) removing the N-terminal protective group of an amino acid or peptide compound of formula (I):

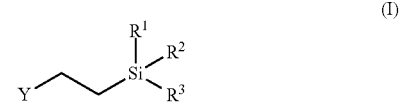

wherein Y represents a residue of an N-protected amino acid or an N-protected peptide, and each of $R^1$, $R^2$, and $R^3$ independently represents an aliphatic hydrocarbon group which may have a substituent or an aromatic hydrocarbon group which may have a substituent, wherein the total number of carbon atoms in the $R^1R^2R^3Si$ group is 18 to 80, and the $R^1R^2R^3SiCH_2CH_2$ group is bonded to the C-terminus of the amino acid or peptide residue in Y; and (2) causing condensation of an N-protected amino acid or an N-protected peptide and the N-terminus of the C-protected amino acid or C-protected peptide obtained in the step (1).

36 Claims, No Drawings

METHOD FOR PRODUCING PEPTIDE COMPOUND

FIELD OF THE INVENTION

The present invention relates to a novel silyl compound which is useful as a protecting agent for a carboxy group of an amino acid or a peptide and a method for producing a peptide using the compound.

BACKGROUND ART

In the liquid phase synthesis of a peptide, a condensation reaction for forming a peptide bond and the subsequent reaction for deprotection of a temporary protective group in the peptide chain elongation must be conducted in a solution, and further the reaction product is required to be soluble in an organic solvent for facilitating purification of the product.

Recently, as a method of easily conducting such a peptide synthesis and purification in a liquid phase, there has been reported a method using, as a protective group, a compound having a trialkylsilyloxy group through an oxyalkylene group or a branched chain-containing aromatic compound (for example, patent documents 1 and 2).

Further, it has been known that, for example, a trimethylsilylethyl group is used for protecting a carboxy group of a peptide, and the bond of the trimethylsilylethyl group is maintained under the conditions for elimination of an N-terminal temporary protective group (for example, a benzyloxycarbonyl group, a fluorenylmethyloxycarbonyl group, or a t-butyloxycarbonyl group) of the peptide, and the trimethylsilylethyl group is selectively eliminated using a fluorinating agent, such as tetrabutylammonium fluoride, while maintaining a side-chain protective group (for example, patent document 3 and non-patent documents 1 and 2).

PRIOR ART REFERENCES

Patent Documents

Patent document 1: International Patent Application Publication No. 2017/038650
Patent document 2: International Patent Application Publication No. 2012/029794
Patent document 3: Japanese Unexamined Patent Publication No. Sho 52-102229

Non-Patent Documents

Non-patent document 1: Organic Letters, 2018, vol. 20, pp. 6166-6169
Non-patent document 2: Tetrahedron Letters, 2004, vol. 45, pp. 3585-3588

SUMMARY OF THE INVENTION

Problems to be Solved by the Invention

With respect to the C-terminal protective group described in patent document 1 or 2 above, deprotection is conducted under acidic conditions, and therefore the use of an N-terminal temporary protective group is limited, and no studies are made on the conditions other than those for the case that the N-terminal temporary protective group is an Fmoc group.

Further, the present inventors have found that the peptide compound protected by a trimethylsilylethyl group described in patent document 3 or non-patent document 1 or 2 above has such poor solubility in an organic solvent that, in the peptide synthesis in a liquid phase, the separation and purification of the compound after the reaction are difficult.

Means for Solving the Problems

In this situation, the present inventors have conducted extensive and intensive studies. As a result, it has been found that when an amino acid or peptide compound is protected at the C-terminus by a tri-substituted silylethyl group in which at least one of the three substituent portions is a long chain alkyl group or an aromatic hydrocarbon group, the resultant C-protected amino acid or peptide compound can be easily dissolved in an organic solvent. Further, it has been found that the above-mentioned tri-substituted silylethyl group is maintained under the conditions for deprotection of the N-terminal temporary protective group and selectively deprotected without causing lowering of the reactivity due to the substituent portions which are bulky, and the present invention has been completed. Specifically, the present invention has the following characteristic features.

[1]
A method for producing a peptide, comprising the steps of:
(1) removing the N-terminal protective group of an amino acid or peptide compound represented by the following formula (I):

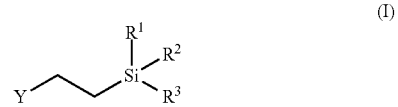

wherein Y represents a residue of an N-protected amino acid or an N-protected peptide, and
each of $R^1$, $R^2$, and $R^3$ independently represents an aliphatic hydrocarbon group which may have a substituent (in which each of 1 to 5 methylene groups in the aliphatic hydrocarbon group may be independently replaced by a structure selected from the group consisting of —O—, —CO—, —N($R^6$)—, —N($R^7$)CO—, and —CON($R^8$)—) or an aromatic hydrocarbon group which may have a substituent, wherein each of $R^6$, $R^7$, and $R^8$ independently represents a hydrogen atom or a $C_{1-6}$ alkyl group,
wherein the total number of carbon atoms in the $R^1R^2R^3$Si group is 18 to 80, and
the $R^1R^2R^3SiCH_2CH_2$ group is bonded to the C-terminus of the amino acid or peptide residue in Y; and
(2) causing condensation of an N-protected amino acid or an N-protected peptide and the N-terminus of the C-protected amino acid or C-protected peptide obtained in the step (1).

[2]
A method for producing a peptide, comprising the steps of:
(1) removing the N-terminal protective group of an amino acid or peptide compound represented by the following formula (I):

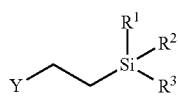

wherein Y represents a residue of an N-protected amino acid or an N-protected peptide, and each of $R^1$, $R^2$, and $R^3$ independently represents an aliphatic hydrocarbon group which may have a substituent (in which each of 1 to 5 methylene groups in the aliphatic hydrocarbon group may be independently replaced by a structure selected from the group consisting of —O—, —CO—, —N($R^6$)—, —N($R^7$)CO—, and —CON($R^8$)—), wherein each of $R^6$, $R^7$, and $R^8$ independently represents a hydrogen atom or a $C_{1-6}$ alkyl group, wherein the total number of carbon atoms in the $R^1R^2R^3$Si group is 18 to 80, and the $R^1R^2R^3$SiCH$_2$CH$_2$ group is bonded to the C-terminus of the amino acid or peptide residue in Y;

and (2) causing condensation of an N-protected amino acid or an N-protected peptide and the N-terminus of the C-protected amino acid or C-protected peptide obtained in the step (1).

[3]

The method according to item [1] above, wherein at least one of the $R^1$, $R^2$, and $R^3$ is an aliphatic hydrocarbon group which may have a substituent (in which one methylene group in the aliphatic hydrocarbon group may be replaced by —O—, and 3 or more carbon atoms in the aliphatic hydrocarbon group are tertiary or quaternary carbon atoms).

[4]

The method according to item [2] above, wherein at least one of the $R^1$, $R^2$, and $R^3$ is an aliphatic hydrocarbon group which may have a substituent (in which one methylene group in the aliphatic hydrocarbon group may be replaced by —O—, and 3 or more carbon atoms in the aliphatic hydrocarbon group are tertiary or quaternary carbon atoms).

[5]

The method according to item [3] or [4] above, wherein the aliphatic hydrocarbon group in the aliphatic hydrocarbon group which may have a substituent (in which one methylene group in the aliphatic hydrocarbon group may be replaced by —O—, and 3 or more carbon atoms in the aliphatic hydrocarbon group are tertiary or quaternary carbon atoms) is a $C_{15-40}$ alkyl group.

[6]

The method according to any one of items [1] to [5] above, wherein each of the $R^1$ and $R^2$ is independently a $C_{1-6}$ alkyl group.

[7]

The method according to item [1] or [3] above, wherein each of the $R^1$ and $R^2$ is independently a phenyl group which may have a substituent.

[8]

The method according to item [7] above, wherein the $R^1$ and $R^2$ are a phenyl group.

[9]

The method according to item [1] above, wherein at least one of the $R^1$, $R^2$, and $R^3$ is an aromatic hydrocarbon group (in which the aromatic hydrocarbon group is substituted with a $C_{15-40}$ alkoxy group).

[10]

The method according to item [9] above, wherein each of the $R^1$ and $R^2$ is independently a $C_{1-6}$ alkyl group.

[11]

The method according to item [9] above, wherein each of the $R^1$ and $R^2$ is independently a phenyl group which may have a substituent.

[12]

The method according to item [11] above, wherein the $R^1$ and $R^2$ are a phenyl group.

[13]

The method according to any one of items [1] to [8] above, wherein the $R^3$ is the following formula (II):

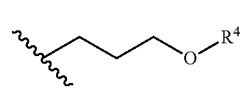

wherein $R^4$ represents a $C_{15-20}$ alkyl group.

[14]

The method according to any one of items [9] to [12] above, wherein the $R^3$ is the following formula (II'):

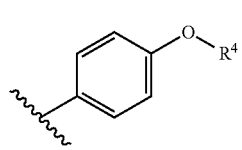

wherein $R^4$ represents a $C_{15-20}$ alkyl group.

[15]

The method according to item [13] or [14] above, wherein 3 or more carbon atoms in the $R^4$ are tertiary or quaternary carbon atoms.

[16]

The method according to item [15] above, wherein the $R^1R^2R^3$Si group is the following formula (III):

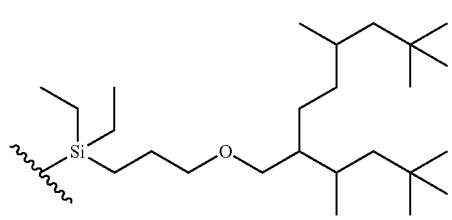

[17]

The method according to item [15] above, wherein the $R^1R^2R^3$Si group is the following formula (III'):

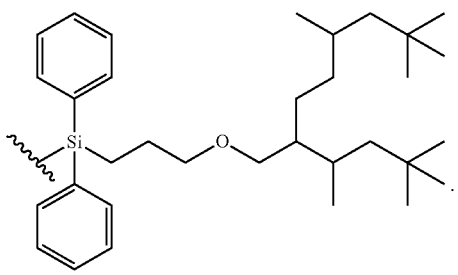

[18]
The method according to item [15] above, wherein the $R^1R^2R^3Si$ group is the following formula (III''):

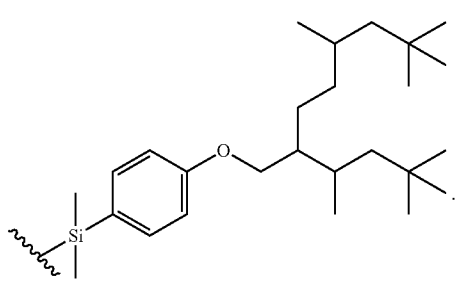

[19]
The method according to item [15] above, wherein the $R^1R^2R^3Si$ group is the following formula (III'''):

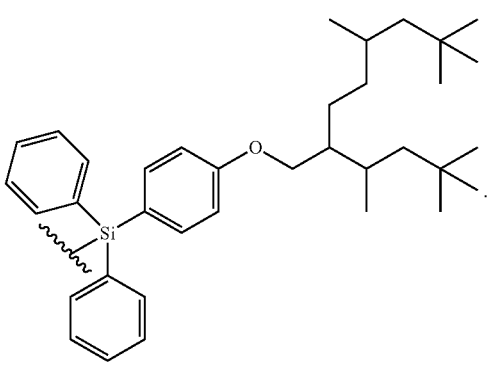

[20]
The method according to any one of items [1] to [19] above, further comprising the step of removing the C-terminal protective group of the peptide obtained in the step (2).

[21]
The method according to any one of items [1] to [19] above, further comprising the step of removing the C-terminal protective group of the peptide obtained in the step (2) using a fluorinating agent.

[22]
The method according to any one of items [1] to [21] above, wherein the total number of carbon atoms in the $R^1R^2R^3Si$ group is 20 to 80.

[23]
The method according to any one of items [1] to [21] above, wherein the total number of carbon atoms in the $R^1R^2R^3Si$ group is 20 to 40.

[24]
The method according to any one of items [1] to [23] above, wherein the N-terminal protective group of the N-protected amino acid or N-protected peptide is a benzyloxycarbonyl group, a 9-fluorenylmethoxycarbonyl group, or a t-butoxycarbonyl group.

[25]
The method according to any one of items [1] to [24] above, wherein the amino acid or peptide comprises an α-amino acid.

[26]
A compound represented by the following formula (IV):

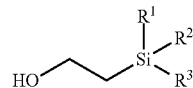

wherein each of $R^1$ and $R^2$ independently represents a $C_{1-6}$ alkyl group, and $R^3$ represents an aliphatic hydrocarbon group which may have a substituent (in which each of 1 to 5 methylene groups in the aliphatic hydrocarbon group may be independently replaced by a structure selected from the group consisting of —O—, —CO—, —N(R$^6$)—, —N(R$^7$)CO—, and —CON(R$^8$)—, and 3 or more carbon atoms in the aliphatic hydrocarbon group are tertiary or quaternary carbon atoms), wherein each of $R^6$, $R^7$, and $R^8$ independently represents a hydrogen atom or a $C_{1-6}$ alkyl group, wherein the total number of carbon atoms in the $R^1R^2R^3Si$ group is 18 to 80.

[27]
A compound represented by the following formula (IV):

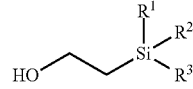

wherein $R^1$ and $R^2$ represent a phenyl group, and $R^3$ represents an aliphatic hydrocarbon group which may have a substituent (in which each of 1 to 5 methylene groups in the aliphatic hydrocarbon group may be independently replaced by a structure selected from the group consisting of —O—, —CO—, —N(R$^6$)—, —N(R$^7$)CO—, and —CON(R$^8$)—, and 3 or more carbon atoms in the aliphatic hydrocarbon group are tertiary or quaternary carbon atoms), wherein each of $R^6$, $R^7$, and $R^8$ independently represents a hydrogen atom or a $C_{1-6}$ alkyl group, wherein the total number of carbon atoms in the $R^1R^2R^3Si$ group is 18 to 80.

[28]
The compound according to item [26] or [27] above, wherein the aliphatic hydrocarbon group in the aliphatic hydrocarbon group which may have a substituent (in which each of 1 to 5 methylene groups in the aliphatic hydrocarbon group may be independently replaced by a structure selected from the group consisting of —O—, —CO—, —N($R^6$)—, —N($R^7$)CO—, and —CON($R^8$)—, and 3 or more carbon atoms in the aliphatic hydrocarbon group are tertiary or quaternary carbon atoms) is a $C_{15-40}$ alkyl group.

[29]
A compound represented by the following formula (IV):

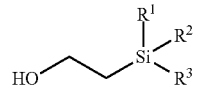
(IV)

wherein each of $R^1$ and $R^2$ independently represents a $C_{1-6}$ alkyl group or a phenyl group, and $R^3$ represents a phenyl group (in which the phenyl group is substituted with a $C_{15-40}$ alkoxy group),
wherein the total number of carbon atoms in the $R^1R^2R^3Si$ group is 18 to 80.

[30]
The compound according to any one of items [26] to [28] above, wherein the $R^3$ is the following formula (II):

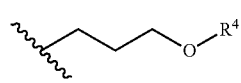
(II)

wherein $R^4$ represents a $C_{15-20}$ alkyl group.

[31]
The compound according to item [29] above, wherein the $R^3$ is the following formula (II'):

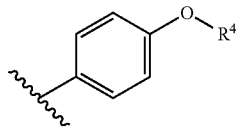
(II')

wherein $R^4$ represents a $C_{15-20}$ alkyl group.

[32]
The compound according to item [30] or [31] above, wherein 3 or more carbon atoms in the $R^4$ are tertiary or quaternary carbon atoms.

[33]
The compound according to any one of items [26] to [32] above, wherein the total number of carbon atoms in the $R^1R^2R^3Si$ group is 20 to 40.

[34]
A compound represented by the following formula (V):

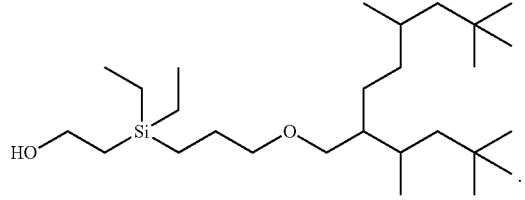
(V)

[35]
A compound represented by the following formula (V'):

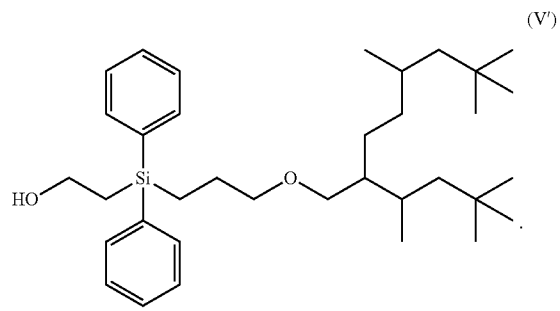 [SMILES: CC(CCC(COCCC[Si](CCO)(c1ccccc1)c1ccccc1)C(C)CC(C)(C)C)CC(C)(C)C]
(V')

[36]
A compound represented by the following formula (V''):

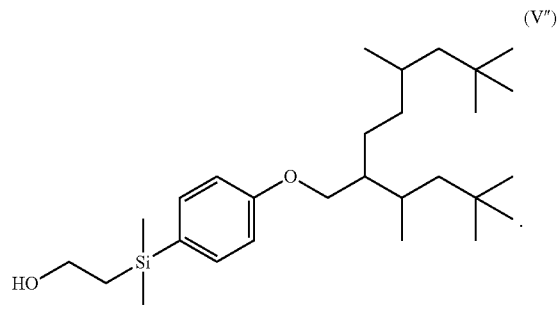 [SMILES: CC(CCC(COc1ccc([Si](C)(C)CCO)cc1)C(C)CC(C)(C)C)CC(C)(C)C]
(V'')

[37]
A compound represented by the following formula (V'''):

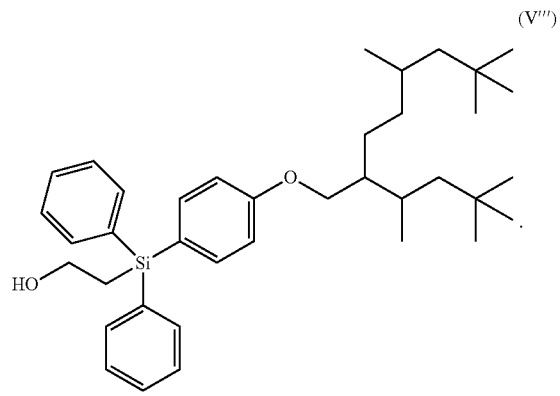 [SMILES: CC(CCC(COc1ccc([Si](CCO)(c2ccccc2)c2ccccc2)cc1)C(C)CC(C)(C)C)CC(C)(C)C]
(V''')

[38]
A reagent for protecting a carboxy group in an amino acid or a peptide, the reagent comprising the compound according to any one of items [26] to [37] above.

Effects of the Invention

An amino acid or peptide protected by the tri-substituted silylethyl group can be easily dissolved in an organic solvent, making it possible to facilitate the separation and purification of the product after the reaction.

MODE FOR CARRYING OUT THE INVENTION

Hereinbelow, the present invention will be described in detail.

In the present specification, the characters and abbreviations have the following meanings: "n-": normal; "i-": iso; "s-": secondary; "t-": tertiary; "Et": ethyl; "Bu": butyl; "Ph": phenyl; "Fmoc": 9-fluorenylmethoxycarbonyl; "Boc": t-butyloxycarbonyl; "Cbz": benzyloxycarbonyl; "TMSE": trimethylsilylethyl; "DMSE": dimethyl(octadecyl)silylethyl; "FESE": (3-((2-(4,4-dimethylpentan-2-yl)-5,7,7-trimethyloctyl)oxy)propyl)diethylsilylethyl; "FPSE": (3-((2-(4,4-dimethylpentan-2-yl)-5,7,7-trimethyloctyl)oxy)propyl)diphenylsilylethyl; "MPSE": 2-((4-((2-(4,4-dimethylpentan-2-yl)-5,7,7-trimethyloctyl)-oxy)phenyl)dimethylsilyl)ethyl; and "TPSE": 2-((4-((2-(4,4-dimethylpentan-2-yl)-5,7,7-trimethyloctyl)-oxy)phenyl)diphenylsilyl)ethyl.

The term "halogen atom" means a fluorine atom, a chlorine atom, a bromine atom, or an iodine atom.

The term "$C_{1-6}$ alkyl group" means a linear or branched alkyl group having 1 to 6 carbon atoms, and specific examples include a methyl group, an ethyl group, a n-propyl group, an isopropyl group, a n-butyl group, an isobutyl group, a s-butyl group, a t-butyl group, a n-pentyl group, and a n-hexyl group.

The term "$C_{15-20}$ alkyl group" means a linear or branched alkyl group having 15 to 20 carbon atoms, and specific examples include a pentadecyl group, an octadecyl group, an icosyl group, a 3,7,11,15-tetramethylhexadecyl group, and a 2-(4,4-dimethylpentan-2-yl)-5,7,7-trimethyloctyl group.

The term "$C_{1-40}$ alkyl group" means a linear or branched alkyl group having 1 to 40 carbon atoms, and specific examples include a methyl group, an ethyl group, a n-propyl group, an isopropyl group, a n-butyl group, an isobutyl group, a s-butyl group, a t-butyl group, a n-pentyl group, a n-hexyl group, an octyl group, a decyl group, a dodecyl group, a hexadecyl group, an octadecyl group, a docosyl group, a triacontyl group, a tetracontyl group, a 3,7,11,15-tetramethylhexadecyl group, and a 2-(4,4-dimethylpentan-2-yl)-5,7,7-trimethyloctyl group.

The term "$C_{15-40}$ alkyl group" means a linear or branched alkyl group having 15 to 40 carbon atoms, and specific examples include a pentadecyl group, a hexadecyl group, an octadecyl group, a docosyl group, a triacontyl group, a tetracontyl group, a 3,7,11,15-tetramethylhexadecyl group, and a 2-(4,4-dimethylpentan-2-yl)-5,7,7-trimethyloctyl group.

The term "$C_{1-6}$ alkylene group" means a divalent substituent obtained by removing one hydrogen atom at an arbitrary position from the "$C_{1-6}$ alkyl group" defined above, and specific examples include a methylene group, an ethylene group, a trimethylene group, a propylene group, a 1,4-butylene group (tetramethylene group), a 1,2-butylene group, a 1,3-butylene group, a 2,3-butylene group, a n-pentylene group (pentamethylene group), and a n-hexylene group (hexamethylene group).

The term "$C_{1-6}$ alkoxy group" means a linear or branched alkoxy group having 1 to 6 carbon atoms, and specific examples include a methoxy group, an ethoxy group, a n-propoxy group, an isopropoxy group, a n-butoxy group, an isobutoxy group, a t-butoxy group, a n-pentyloxy group, and a n-hexyloxy group.

The term "$C_{15-20}$ alkoxy group" means a linear or branched alkoxy group having 15 to 20 carbon atoms, and specific examples include a pentadecyloxy group, an octadecyloxy group, an icosyloxy group, a 3,7,11,15-tetramethylhexadecyl group, and a 2-(4,4-dimethylpentan-2-yl)-5,7,7-trimethyloctyloxy group.

The term "$C_{1-40}$ alkoxy group" means a linear or branched alkoxy group having 1 to 40 carbon atoms, and specific examples include a methoxy group, an ethoxy group, a n-propoxy group, an isopropoxy group, a n-butoxy group, an isobutoxy group, a t-butoxy group, a n-pentyloxy group, a n-hexyloxy group, an octyloxy group, a decyloxy group, a dodecyloxy group, a hexadecyloxy group, an octadecyloxy group, a docosyloxy group, a triacontyloxy group, a tetracontyloxy group, a 3,7,11,15-tetramethylhexadecyl group, and a 2-(4,4-dimethylpentan-2-yl)-5,7,7-trimethyloctyloxy group.

The term "$C_{15-40}$ alkoxy group" means a linear or branched alkoxy group having 15 to 40 carbon atoms, and specific examples include a pentadecyloxy group, a hexadecyloxy group, an octadecyloxy group, a docosyloxy group, a triacontyloxy group, a tetracontyloxy group, a 3,7,11,15-tetramethylhexadecyl group, and a 2-(4,4-dimethylpentan-2-yl)-5,7,7-trimethyloctyloxy group.

The term "$C_{2-20}$ alkenyl group" means a linear or branched alkenyl group having 2 to 20 carbon atoms, and specific examples include a vinyl group, a 1-propenyl group, an allyl group, an isopropenyl group, a 2-butenyl group, a 3-butenyl group, a retinyl group, and a phytinyl group.

The term "$C_{2-6}$ alkynyl group" means a linear or branched alkynyl group having 2 to 6 carbon atoms, and specific examples include an ethynyl group and a 1-propynyl group.

The term "$C_{3-6}$ cycloalkyl group" means a cycloalkyl group having 3 to 6 carbon atoms, and specific examples include a cyclopropyl group, a cyclobutyl group, a cyclopentyl group, and a cyclohexyl group.

The term "$C_{6-14}$ aryl group" means an aromatic hydrocarbon group having 6 to 14 carbon atoms, and specific examples include a phenyl group, a 1-naphthyl group, a 2-naphthyl group, a 1-anthracenyl group, a 2-anthracenyl group, a 9-anthracenyl group, and a biphenyl group.

The term "$C_{6-14}$ aryloxy group" means an aryloxy group having 6 to 14 carbon atoms, and specific examples include a phenoxy group, a 1-naphthyloxy group, a 2-naphthyloxy group, a 1-anthracenyloxy group, a 2-anthracenyloxy group, a 9-anthracenyloxy group, and a biphenyloxy group.

The term "$C_{7-14}$ aralkyl group" means an aralkyl group having 7 to 14 carbon atoms, and specific examples include a benzyl group, a 1-phenylethyl group, a 2-phenylethyl group, a 1-phenylpropyl group, a naphthylmethyl group, a 1-naphthylethyl group, and a 1-naphthylpropyl group.

The term "tri-$C_{1-6}$ alkylsilyl group" means a group corresponding to a silyl group having bonded thereto the above-mentioned three "$C_{1-6}$ alkyl groups" which are the same or different, and specific examples include a trimethylsilyl group, a triethylsilyl group, a triisopropylsilyl group, a t-butyldimethylsilyl group, and a di-t-butylisobutylsilyl group.

The term "tri-$C_{1-6}$ alkylsilyloxy group" means a group corresponding to a silyloxy group having bonded thereto the above-mentioned three "$C_{1-6}$ alkyl groups" which are the same or different, and specific examples include a trimethylsilyloxy group, a triethylsilyloxy group, a triisopropylsilyloxy group, a t-butyldimethylsilyloxy group, and a di-t-butylisobutylsilyloxy group.

The term "5- to 10-membered heterocyclic group" means a heterocyclic group that is monocyclic or of a fused ring type, in which the number of the atoms constituting the ring is 5 to 10, and the atoms constituting the ring contain 1 to 4 heteroatoms independently selected from the group consisting of a nitrogen atom, an oxygen atom, and a sulfur atom. The heterocyclic group may be of any type of a saturated ring, a partially unsaturated ring, and an unsaturated ring, and specific examples include a pyrrolidinyl group, a tetrahydrofuryl group, a tetrahydrothienyl group, a piperidyl group, a tetrahydropyranyl group, a tetrahydrothiopyranyl group, a pyrrolyl group, a furyl group, a thienyl group, a pyridyl group, a pyrimidinyl group, a pyridazinyl group, an azepanyl group, an oxepanyl group, a thiepanyl group, an azepinyl group, an oxepinyl group, a thiepinyl group, an imidazolyl group, a pyrazolyl group, an oxazolyl group, a thiazolyl group, an imidazolinyl group, a pyrazinyl group, a morpholinyl group, a thiazinyl group, an indolyl group, an isoindolyl group, a benzimidazolyl group, a purinyl group, a quinolyl group, an isoquinolyl group, a quinoxalinyl group, a cinnolinyl group, a pteridinyl group, a chromenyl group, and an isochromenyl group.

The term "aliphatic hydrocarbon group" is a linear, branched, or cyclic saturated or unsaturated aliphatic hydrocarbon group, and examples include an alkyl group, a cycloalkyl group, an alkenyl group, an alkynyl group, and an aralkyl group, and specific examples include a $C_{1-40}$ alkyl group, a $C_{3-6}$ cycloalkyl group, a $C_{2-20}$ alkenyl group, a $C_{2-6}$ alkynyl group, and a $C_{7-14}$ aralkyl group.

The term "aromatic hydrocarbon group" means a hydrocarbon group comprised of a single ring or a plurality of rings, in which at least one ring in the group is aromatic, and specific examples include a phenyl group, a naphthyl group, an anthracenyl group, an indenyl group, a phenalenyl group, and an indanyl group, and preferred is a $C_{6-14}$ aryl group, and more preferred is a phenyl group.

The term "which may have a substituent" means being unsubstituted or being substituted with an arbitrary substituent or substituents of which the number is chemically acceptable and arbitrary.

With respect to the above-mentioned "arbitrary substituent", there is no particular limitation as long as it is a substituent that does not adversely affect the reaction which is to be conducted in the present invention.

With respect to the "substituent" in the "aliphatic hydrocarbon group which may have a substituent", examples include a $C_{6-14}$ aryl group, a $C_{6-14}$ aryloxy group, a 5-to 10-membered heterocyclic group, a hydroxyl group, an amino group, a halogen atom, a tri-$C_{1-6}$ alkylsilyl group, a tri-$C_{1-6}$ alkylsilyloxy group, a cyano group, and a nitro group, and preferred is a $C_{6-14}$ aryl group or a tri-$C_{1-6}$ alkylsilyloxy group.

With respect to the "substituent" in the "aromatic hydrocarbon group which may have a substituent", examples include a halogen atom, a $C_{1-40}$ alkoxy group, and a nitro group, and preferred is a $C_{1-40}$ alkoxy group, and more preferred is a $C_{15-40}$ alkoxy group, and further preferred is a $C_{15-20}$ alkoxy group.

The terms "N-protected amino acid" and "N-protected peptide" respectively mean an amino acid and a peptide, each having an N-terminal amino group which is protected, and having a C-terminal carboxy group which is not protected.

The term "residue of an N-protected amino acid or an N-protected peptide" means a group formed by removing a hydrogen atom from the C-terminal carboxy group of an N-protected amino acid or an N-protected peptide.

The terms "C-protected amino acid" and "C-protected peptide" respectively mean an amino acid and a peptide, each having a C-terminal carboxy group which is protected, and having an N-terminal amino group which is not protected.

The amino acid used in the present invention is an organic compound having both an amino group and a carboxy group as functional groups, and is preferably an α-amino acid, a β-amino acid, a γ-amino acid, or a δ-amino acid, more preferably an α-amino acid or a β-amino acid, further preferably an α-amino acid. Further, the amino acid used in the present invention includes the above amino acids in which two or more amino groups are present (for example, arginine and lysine), two or more carboxy groups are present (for example, glutamic acid and aspartic acid), or a reactive functional group is present (for example, cysteine and serine), wherein the amino group, carboxy group, and/or reactive functional group, which does not participate in the formation of a peptide, is protected and/or modified.

The amino group of the amino acid used in the present invention may be substituted. The substituent for the amino group is preferably an aliphatic hydrocarbon group which may have a substituent, more preferably a $C_{1-6}$ alkyl group or a $C_{7-14}$ aralkyl group, further preferably a methyl group.

The peptide is well known to those skilled in the art, but is supplementarily explained as follows. The peptide in the present invention means a molecule comprising amino acids as a monomer bonded in a chain form through a peptide bond, and the amino acids constituting the peptide used in the present invention are the above-mentioned amino acids. Further, with respect to the number of the amino acids constituting the peptide used in the present invention, there is no particular limitation as long as it is 2 or more, but the number of the amino acids is preferably 100 or less, more preferably 50 or less, further preferably 10 or less.

With respect to the stereostructure of an α-amino acid, there is no particular limitation, but preferred is an L-form amino acid.

The term "temporary protective group" means a protective group which is positioned on the terminus side from which a peptide chain is elongated, and which is removed (deprotected) before conducting a peptide chain elongation reaction (condensation step), and, as an example of the temporary protective group in the elongation of a peptide chain from the N-terminus side, there can be mentioned an N-terminal protective group. Specific examples of N-terminal protective groups include carbamate protective groups (such as a 9-fluorenylmethoxycarbonyl (Fmoc) group, a t-butoxycarbonyl (Boc) group, a benzyloxycarbonyl (Cbz) group, an allyloxycarbonyl group, a 2,2,2-trichloroethoxycarbonyl group, and a 2-(p-biphenyl)isopropyloxycarbonyl group), amide protective groups (such as an acetyl group and a trifluoroacetyl group), imide protective groups (such as a phthaloyl group), sulfonamide protective groups (such as a p-toluenesulfonyl group and a 2-nitrobenzenesulfonyl group), and a benzyl group.

All the technical terms and science terms used in the present specification have the same meanings as the meanings that are generally understood by those skilled in the art in the technical field to which the present invention belongs. The arbitrary methods and materials similar to or equivalent to those described in the present specification can be used in the practice of the present invention or the tests in the present invention, but preferred methods and materials are described below. All the publications and patents to which the present specification refers are incorporated for reference into the present specification for the purpose of, for example, describing and disclosing the structure and methodology described in the publications that can be used in connection with the described invention.

[Compound of the Present Invention]

The "tri-substituted silylethyl compound" in the present invention means a compound represented by the following formula (IV):

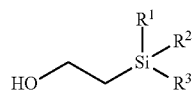

wherein each of $R^1$ and $R^2$ independently represents a $C_{1-6}$ alkyl group or a phenyl group, and $R^3$ represents an aliphatic hydrocarbon group which may have a substituent (in which each of 1 to 5 methylene groups in the aliphatic hydrocarbon group may be independently replaced by a structure selected from the group consisting of —O—, —CO—, —N($R^6$)—, —N($R^7$)CO— and —CON($R^8$)—, and 3 or more carbon atoms in the aliphatic hydrocarbon group are tertiary or quaternary carbon atoms) or a phenyl group (in which the phenyl group is substituted with a $C_{15-40}$ alkoxy group), wherein each of $R^6$, $R^7$, and $R^8$ independently represents a hydrogen atom or a $C_{1-6}$ alkyl group, wherein the total number of carbon atoms in the $R^1R^2R^3$Si group is 18 to 80.

Each of $R^1$ and $R^2$ is independently preferably a methyl group, an ethyl group, an isopropyl group, an n-butyl group, or a phenyl group, more preferably a methyl group, an ethyl group, or a phenyl group.

$R^3$ is preferably a $C_{15-40}$ alkyl group which may have a substituent (in which each of 1 to 5 methylene groups in the $C_{15-40}$ alkyl group may be independently replaced by a structure selected from the group consisting of —O—, —CO—, —N($R^6$)—, —N($R^7$)CO—, and —CON($R^8$)—, and 3 or more carbon atoms in the $C_{15-40}$ alkyl group are tertiary or quaternary carbon atoms) or a phenyl group (in which the phenyl group is substituted with a $C_{15-40}$ alkoxy group), more preferably the following formula (II):

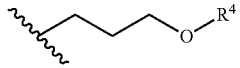

wherein $R^4$ represents a $C_{15-20}$ alkyl group, or the following formula (II'):

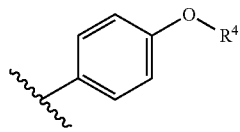

wherein $R^4$ represents a $C_{15-20}$ alkyl group, further preferably the formula (II) or (II') above wherein 3 or more carbon atoms in $R^4$ are tertiary or quaternary carbon atoms, especially preferably the following formula (VII):

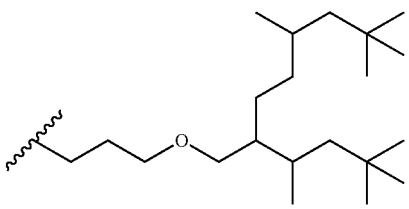

or the following formula (VII'):

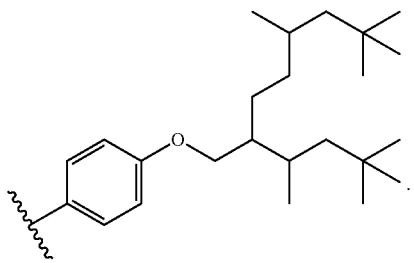

The "total number of carbon atoms in the $R^1R^2R^3$Si group" means the total of the number of carbon atoms of $R^1$, $R^2$, and $R^3$, and, when at least one of $R^1$, $R^2$, and $R^3$ has a substituent, the number of carbon atoms of the substituent is included in the total number.

The total number of carbon atoms in the $R^1R^2R^3$Si group is preferably 18 or more, more preferably 18 to 80, further preferably 20 to 80, especially preferably 20 to 40.

[Method for Producing the Compound of the Present Invention]

A general method for producing the compound of the present invention, which is represented by the formula (IV), is described below.

With respect to the solvent used in the general method described below, there is no particular limitation as long as the solvent does not adversely affect the reaction. As examples of such solvents, there can be mentioned the followings:

halogen-containing hydrocarbon solvents (for example, dichloromethane and chloroform);

aliphatic hydrocarbon solvents (for example, hexane and heptane);

aromatic hydrocarbon solvents (for example, toluene and xylene);

ether solvents (for example, tetrahydrofuran, cyclopentyl methyl ether, and methyl-t-butyl ether);

ester solvents (for example, ethyl acetate and isopropyl acetate);

alcohol solvents (for example, methanol, ethanol, 2-propanol, and 2,2,2-trifluoroethanol);

amide solvents (for example, N,N-dimethylformamide, N-methylpyrrolidone, and 1,3-dimethyl-2-imidazolidinone); and nitrile solvents (for example, acetonitrile).

A preferred solvent in each step is described later.

With respect to the method for producing the compound of the present invention, there is no particular limitation, but, for example, the compound of the present invention can be produced according to the reaction formula shown below.

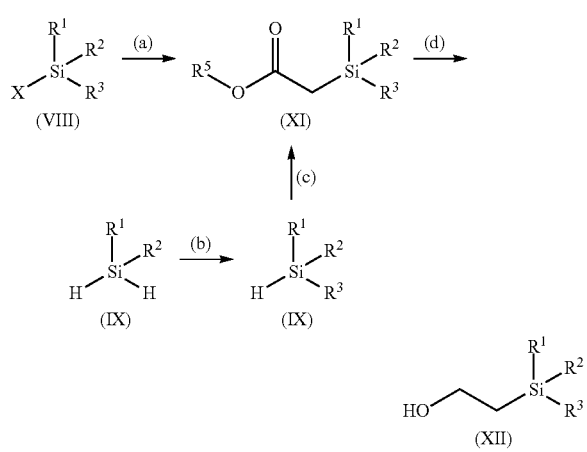

(XII)

In the above formulae, $R^1$, $R^7$, and $R^3$ are as defined above, X represents a leaving group, such as a halogen atom or a $C_{1-6}$ alkoxy group, and $R^5$ represents a $C_{1-6}$ alkyl group or a benzyl group.

Compounds (VIII) and (IX) as raw materials, unless otherwise specified, are easily commercially available or can be produced according to a known method or an equivalent method.

The yield of the compound obtained in each of the methods described below can vary depending on the reaction conditions used, but the compound having a high purity can be obtained by subjecting the product of each method to isolation and purification using a general means (such as distillation or column chromatography).

Step (a)

The present step is the step of obtaining compound (XI) from compound (VIII).

The reaction in the step is conducted by reacting compound (VIII) and an acetate in the presence of a base in a solvent which does not adversely affect the reaction.

Examples of the solvent which does not adversely affect the reaction include halogen-containing hydrocarbon solvents, aliphatic hydrocarbon solvents, aromatic hydrocarbon solvents, and ether solvents. Preferred is an aliphatic hydrocarbon solvent, an aromatic hydrocarbon solvent, or an ether solvent, and more preferred is heptane, tetrahydrofuran, or methyl-t-butyl ether.

Examples of the bases used in the reaction include sodium t-butoxide, potassium t-butoxide, lithium diisopropylamine, sodium bis(trimethylsilyl)amide, and potassium bis(trimethylsilyl)amide. Preferred is lithium diisopropylamine.

Examples of the acetates used in the reaction include methyl acetate, ethyl acetate, n-propyl acetate, i-propyl acetate, n-butyl acetate, and benzyl acetate. Preferred is ethyl acetate. The acetate used in the reaction is easily commercially available or can be produced according to a known method or an equivalent method.

When the reaction is conducted, the reaction temperature is generally −90 to 40° C., preferably −90 to 0° C., more preferably −80 to −20° C. Further, the reaction time is generally 1 to 72 hours, preferably 1 to 24 hours.

Step (b)

The present step is the step of obtaining compound (X) from compound (IX).

The reaction in the step is conducted by reacting compound (IX) and an allyl compound having a group corresponding to $R^3$ in the presence of a metal catalyst in a solvent which does not adversely affect the reaction.

Examples of the solvent which does not adversely affect the reaction include halogen-containing hydrocarbon solvents, aliphatic hydrocarbons, aromatic hydrocarbon solvents, ether solvents, ester solvents, amide solvents, and nitrile solvents. Preferred is an aliphatic hydrocarbon, an aromatic hydrocarbon solvent, or an ether solvent, and more preferred is toluene, tetrahydrofuran, or methyl-t-butyl ether.

Examples of the metal catalysts used in the reaction include platinum catalysts (for example, a platinum-1,3-divinyltetramethyldisiloxane complex and hexachloroplatinic acid) and rhodium catalysts (for example, chlorotris(triphenylphosphine)rhodium). Preferred is hexachloroplatinic acid or chlorotris(triphenylphosphine)rhodium.

With respect to the allyl compound having a group corresponding to $R^3$ used in the reaction, for example, there can be mentioned the following formula (VI):

$$\diagup\!\!\!\diagup\!\!\!\diagdown^{L^2}\!\!\diagdown_{L^1}\!\!\diagup^{R^4} \tag{VI}$$

wherein $R^4$ represents a $C_{15-20}$ alkyl group,
$L^1$ is —O— or a methylene group, and $L^2$ represents a $C_{1-6}$ alkylene group.

Preferred is the allyl compound of the formula (VI) wherein $L^1$ is —O— and $L^2$ is a $C_{1-6}$ alkylene group, and more preferred is the allyl compound of the formula (VI) wherein $L^1$ is —O— and $L^2$ is a methylene group. The allyl compound used in the reaction is easily commercially available or can be produced according to a known method or an equivalent method.

When the reaction is conducted, the reaction temperature is generally an arbitrary temperature in the range of from −20° C. to the boiling point of the solvent used, preferably 0 to 60° C., more preferably 10 to 40° C. Further, the reaction time is generally 1 to 72 hours, preferably 1 to 24 hours.

Step (c)

The present step is the step of obtaining compound (XI) from compound (X).

The reaction in the step is conducted by reacting compound (X) and a diazoacetate in the presence of a metal catalyst in a solvent which does not adversely affect the reaction.

Examples of the solvent which does not adversely affect the reaction include halogen-containing hydrocarbon solvents, aliphatic hydrocarbon solvents, aromatic hydrocarbon solvents, and ether solvents. Preferred is a halogen-containing hydrocarbon solvent, an aliphatic hydrocarbon solvent, an aromatic hydrocarbon solvent, or an ether solvent, and more preferred is methylene chloride, heptane, or toluene.

Examples of the metal catalysts used in the reaction include iron catalysts (for example, iron trifluoromethanesulfonate), rhodium catalysts (for example, rhodium acetate), and copper catalysts (for example, copper trifluoromethanesulfonate). Preferred is rhodium acetate.

Examples of the diazoacetates used in the reaction include methyl diazoacetate, ethyl diazoacetate, n-propyl diazoacetate, i-propyl diazoacetate, n-butyl diazoacetate, and benzyl diazoacetate. Preferred is ethyl diazoacetate. The diazoacetate used in the reaction is easily commercially available or can be produced according to a known method or an equivalent method.

When the reaction is conducted, the reaction temperature is generally an arbitrary temperature in the range of from -20° C. to the boiling point of the solvent used, preferably 0 to 60° C., more preferably 10 to 40° C. Further, the reaction time is generally 1 to 72 hours, preferably 1 to 24 hours.

Step (d)

The present step is the step of obtaining compound (XII) from compound (XI).

The reaction in the step is conducted by reacting compound (XI) using a reducing agent in a solvent which does not adversely affect the reaction.

Examples of the solvent which does not adversely affect the reaction include halogen-containing hydrocarbon solvents, aliphatic hydrocarbon solvents, aromatic hydrocarbon solvents, ether solvents, and nitrile solvents. Preferred is a halogen-containing hydrocarbon solvent or an ether solvent, and more preferred is methylene chloride or tetrahydrofuran.

Examples of the reducing agents used in the reaction include hydrobis(2-methylpropyl)aluminum and tetrahydro-lithium-aluminum. Preferred is tetrahydro-lithium-aluminum.

When the reaction is conducted, the reaction temperature is generally an arbitrary temperature in the range of from -20° C. to the boiling point of the solvent used, preferably 0 to 60° C., more preferably 10 to 40° C. Further, the reaction time is generally 1 to 24 hours, preferably 1 to 5 hours.

With respect to another mode of the method for producing the compound of the present invention, for example, the compound of the present invention can be produced according to the reaction formula shown below.

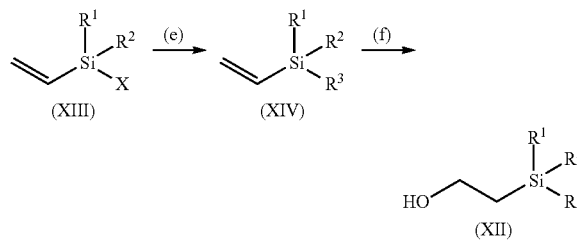

In the above formulae, $R^1$, $R^2$, and $R^3$ are as defined above, and X represents a leaving group, such as a halogen atom or a $C_{1-6}$ alkoxy group.

Compound (XIII) as a raw material, unless otherwise specified, is easily commercially available or can be produced according to a known method or an equivalent method.

The yield of the compound obtained in each of the methods described below can vary depending on the reaction conditions used, but the compound having a high purity can be obtained by subjecting the product of each method to isolation and purification using a general means (such as distillation or column chromatography).

Step (e)

The present step is the step of obtaining compound (XIV) from compound (XIII).

The reaction in the step is conducted by reacting compound (XIII) and an organometal reagent prepared from an organohalogen compound having a group corresponding to $R^3$ and a metal reagent in a solvent which does not adversely affect the reaction.

Examples of the solvent which does not adversely affect the reaction include aliphatic hydrocarbon solvents, aromatic hydrocarbon solvents, and ether solvents. Preferred is an aliphatic hydrocarbon solvent or an ether solvent, and more preferred is hexane, heptane, or tetrahydrofuran.

With respect to the organohalogen compound having a group corresponding to $R^3$ used in the reaction, for example, there can be mentioned the following formula (VI'):

wherein $R^4$ represents a $C_{15-40}$ alkyl group,
$L^1$ is —O— or a methylene group, $L^2$ is an aromatic hydrocarbon group,
and X represents a halogen atom.

Preferred is the organohalogen compound of the formula (VI') wherein $L^1$ is —O—, $L^2$ is phenyl, and X is a halogen atom, and more preferred is the organohalogen compound of the formula (VI') wherein $L^1$ is —O—, $L^2$ is phenyl, and X is a bromine atom. The organohalogen compound used in the reaction is easily commercially available or can be produced according to a known method or an equivalent method.

Examples of the metal reagents used in the reaction include zinc, magnesium, n-butyllithium, and s-butyllithium. Preferred is n-butyllithium.

When the reaction is conducted, the reaction temperature is generally an arbitrary temperature in the range of from -90° C. to the boiling point of the solvent used, preferably -90 to 0° C., more preferably -80 to -20° C. Further, the reaction time is generally 1 to 72 hours, preferably 1 to 24 hours.

Step (f)

The present step is the step of obtaining compound (XII) from compound (XIV).

The reaction in the step is conducted by reacting a boron reagent and compound (XIV) in a solvent which does not adversely affect the reaction, and then treating the resultant product with a base and an oxidizing reagent.

Examples of the solvent which does not adversely affect the reaction include halogen-containing hydrocarbon solvents, aliphatic hydrocarbons, aromatic hydrocarbon solvents, ether solvents, ester solvents, and nitrile solvents. Preferred is an aliphatic hydrocarbon, an aromatic hydrocarbon solvent, or an ether solvent, and more preferred is toluene or tetrahydrofuran.

Examples of the boron reagents used in the reaction include a borane-tetrahydrofuran complex, a borane-dimethyl sulfide complex, disiamylborane, dicyclohexylborane, 9-borabicyclo[3.3.1]nonane, catecholborane, pinacolborane, and diisopinocampheylborane. Preferred is a borane-tetrahydrofuran complex, bicyclo[3.3.1]nonane, or diisopinocampheylborane, and more preferred is bicyclo[3.3.1]nonane.

Examples of the bases used in the reaction include sodium hydroxide, potassium hydroxide, potassium carbonate, and potassium hydrogencarbonate. Preferred is sodium hydroxide.

Examples of the oxidizing reagents used in the reaction include an aqueous solution of hydrogen peroxide.

When the reaction is conducted, the reaction temperature is generally an arbitrary temperature in the range of from -20° C. to the boiling point of the solvent used, preferably 0 to 60° C., more preferably 10 to 40° C. Further, the reaction time is generally 1 to 72 hours, preferably 1 to 24 hours.

[Method for Producing a Peptide of the Present Invention]

An amino acid or peptide protected by the tri-substituted silylethyl group can be easily dissolved in an organic solvent, making it possible to facilitate the separation and purification of the product after the reaction. In an embodiment, the tri-substituted silylethyl group is selectively deprotected using a fluorinating agent while maintaining the other protective group in the peptide without causing lowering of the reactivity due to the three substituent portions which are bulky. Further, in another embodiment, with respect to the amino acid or peptide having the tri-substituted silylethyl group introduced to the C-terminus thereof, using, for example, an Fmoc group, a Boc group, or a Cbz group as an N-terminal temporary protective group, the peptide chain can be elongated in the N-terminus direction.

With respect to the method for producing a peptide of the present invention (hereinafter, referred to as "the present method"), there is no particular limitation, but the present method can be conducted by performing all of or an appropriate combination of the steps (i) to (viii) described below.

The present method is described based on the followings.

(a) The tri-substituted silylethyl group used in the present method is a group derived from a compound represented by the following formula (IV):

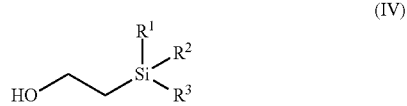

(IV)

wherein each of $R^1$, $R^2$, and $R^3$ independently represents an aliphatic hydrocarbon group which may have a substituent (in which each of 1 to 5 methylene groups in the aliphatic hydrocarbon group may be independently replaced by a structure selected from the group consisting of —O—, —CO—, —N($R^6$)—, —N($R^7$)CO—, and —CON($R^8$)—) or an aromatic hydrocarbon group which may have a substituent, wherein each of $R^6$, $R^7$, and $R^8$ independently represents a hydrogen atom or a $C_{1-6}$ alkyl group, wherein the total number of carbon atoms in the $R^1R^2R^3Si$ group is 18 to 80.

(b) With respect to the specific conditions for reaction, there is no particular limitation as long as the production of a peptide in the present invention can be achieved. The preferred conditions for each reaction are appropriately described in detail below.

(c) With respect to the solvents described in connection with each reaction, the solvents may be used individually or in combination.

Step (i): C-Terminal Protection Step

The present step is the step of introducing the compound of the present invention into the C-terminus of an N-protected amino acid or an N-protected peptide.

The reaction in the step is conducted by reacting the compound of the present invention and an N-protected amino acid or an N-protected peptide in the presence of a condensing agent in a solvent which does not adversely affect the reaction.

Examples of the solvent which does not adversely affect the reaction include halogen-containing hydrocarbon solvents, aliphatic hydrocarbon solvents, aromatic hydrocarbon solvents, ether solvents, ester solvents, amide solvents, and nitrile solvents. Preferred is a halogen-containing hydrocarbon solvent, an aromatic hydrocarbon solvent, an ether solvent, an ester solvent, or an amide solvent, and more preferred is methylene chloride, toluene, cyclopentyl methyl ether, isopropyl acetate, or N,N-dimethylformamide.

With respect to the condensing agent used in the reaction, there is no particular limitation, but examples include carbodiimide condensing agents (for example, N,N'-dicyclohexylcarbodiimide (DCC), N,N'-diisopropylcarbodiimide, and 1-ethyl-3-dimethylaminopropylcarbodiimide hydrochloride (EDCI)), chloroformate condensing agents (for example, ethyl chloroformate and isobutyl chloroformate), imidazole condensing agents (for example, 1,1'-carbonyldiimidazole (CDI)), phosphonium condensing agents (for example, (benzotriazol-1-yloxy)tripyrrolidinophosphonium hexafluorophosphate (PyBOP (registered trademark)) and bromotripyrrolidinophosphonium hexafluorophosphate (PyBrop (registered trademark))), uronium condensing agents (for example, O-(benzotriazol-1-yl)-N,N,N',N'-tetramethyluronium tetrafluoroborate (TBTU), 1-[bis(dimethylamino)methylene]-5-chloro-1H-benzotriazolium 3-oxide hexafluorophosphate (HCTU), O-benzotriazole-N,N,N',N'-tetramethyluronium hexafluoroborate (HBTU), and (1-cyano-2-ethoxy-2-oxoethylideneaminooxy)dimethylamino-morpholino-carbenium hexafluorophosphate (COMU)), and AllessanCAP (registered trademark).

In the reaction, an additive and a base can be appropriately used as long as they do not inhibit the reaction.

With respect to the additive used in the reaction, there is no particular limitation, but examples include N,N-dimethyl-4-aminopyridine (DMAP), 1-hydroxybenzotriazole (HOBt), ethyl 1-hydroxy-1H-1,2,3-triazole-5-carboxylate (HOCt), 1-hydroxy-7-azabenzotriazole (HOAt), and ethyl (hydroxyimino)cyanoacetate (OxymaPure).

With respect to the base used in the reaction, there is no particular limitation, but examples include aliphatic amines (for example, triethylamine, N,N-diisopropylethylamine, and N-methylmorpholine) and aromatic amines (for example, pyridine). Preferred is an aliphatic amine, and more preferred is N,N-diisopropylethylamine.

When the reaction is conducted, the reaction temperature is generally an arbitrary temperature in the range of from −20° C. to the boiling point of the solvent used, preferably −10 to 60° C., more preferably −10 to 40° C. Further, the reaction time is generally 1 to 24 hours, preferably 1 to 6 hours.

Step (ii): N-Terminal Deprotection Step

The present step is the step of removing the N-terminal protective group of the amino acid or peptide obtained in step (i) above.

With respect to the N-terminal protective group, there can be used the temporary protective group for amino group generally used in the technical field of peptide chemistry and others. The N-terminal protective group is preferably a protective group which can be eliminated under conditions different from those for elimination of the tri-substituted silylethyl group, more preferably a carbamate protective group (such as a 9-fluorenylmethoxycarbonyl group, a t-butoxycarbonyl group, a benzyloxycarbonyl group, a 2,2,2-trichloroethoxycarbonyl group, or an allyloxycarbonyl group), further preferably a 9-fluorenylmethoxycarbonyl group, a t-butoxycarbonyl group, or a benzyloxycarbonyl group.

Conditions for the deprotection are appropriately selected depending on the type of the N-terminal protective group, but it is preferred that the deprotection is conducted in a solvent which does not adversely affect the reaction under conditions different from those for elimination of the tri-substituted silylethyl group. For example, in the case of a 9-fluorenylmethoxycarbonyl group, deprotection is conducted by treatment with a base, in the case of a t-butoxycarbonyl group, deprotection is conducted by treatment with an acid, and, in the case of a benzyloxycarbonyl group, deprotection is conducted by hydrogenation in the presence of a metal catalyst.

The solvent which does not adversely affect the reaction is appropriately selected depending on the deprotection conditions for the N-terminal protective group. For example, in the case of a 9-fluorenylmethoxycarbonyl group and a t-butoxycarbonyl group, there can be mentioned halogen-containing hydrocarbon solvents, aliphatic hydrocarbon solvents, aromatic hydrocarbon solvents, ether solvents, and ester solvents, and, in the case of a benzyloxycarbonyl group, there can be mentioned alcohol solvents, aromatic hydrocarbon solvents, ether solvents, and ester solvents.

Examples of the bases used in the step include dimethylamine, diethylamine, piperidine, morpholine, N,N-dimethyl-1,3-propanediamine, and diazabicycloundecene.

Examples of the acids used in the reaction include hydrochloric acid, sulfuric acid, trifluoroacetic acid, and trifluoromethanesulfonic acid.

Examples of the metal catalysts used in the reaction include a palladium-carbon powder, a platinum-carbon powder, a ruthenium-carbon powder, and an alumina powder.

When the reaction is conducted, the reaction temperature is generally an arbitrary temperature in the range of from −20° C. to the boiling point of the solvent used, preferably 0 to 60° C., more preferably 10 to 40° C. Further, the reaction time is generally 1 to 24 hours, preferably 1 to 6 hours.

Step (iii): Condensation Step

The present step is the step of causing condensation of an N-protected amino acid or an N-protected peptide and the N-terminus of the C-protected amino acid or C-protected peptide obtained in step (ii) above.

The reaction in the step is conducted under the condensation conditions generally used in the technical field of peptide chemistry and others, for example, conducted in the presence of a condensing agent, an additive, and/or a base similar to those used in step (i).

After the reaction, by adding a nucleophile, the activated C-terminus of the N-protected amino acid or N-protected peptide residue can be inactivated.

With respect to the nucleophile used after the reaction, there is no particular limitation, but examples include primary or secondary amines. Preferred is an aliphatic amine (for example, propylamine or N,N-dimethyl-1,3-propanediamine) or benzylamine, and more preferred is N,N-dimethyl-1,3-propanediamine.

By virtue of the nucleophile used after the reaction, deprotection for an Fmoc group which is the N-terminal protective group can be made simultaneously with inactivation of the C-terminus.

Step (iv): Purification Step

The present step is the step of purifying the amino acid or peptide obtained in steps (i) to (iii) above by liquid separating operations.

In the liquid separating operations, a solution having a peptide dissolved therein is washed with water, an acidic and/or basic aqueous solution, and/or a poor solvent according to the intended peptide or impurities that are possibly contained in the peptide, making it possible to remove the impurities.

With respect to the acidic aqueous solution used in the liquid separating operations, there is no particular limitation, but examples include hydrochloric acid, sulfuric acid, an aqueous solution of acetic acid, an aqueous solution of phosphoric acid, an aqueous solution of citric acid, an aqueous solution of ammonium chloride, and an aqueous solution of potassium hydrogensulfate. Preferred is hydrochloric acid or an aqueous solution of potassium hydrogensulfate.

With respect to the basic aqueous solution used in the liquid separating operations, there is no particular limitation, but examples include an aqueous solution of sodium hydrogencarbonate, an aqueous solution of potassium hydrogencarbonate, an aqueous solution of sodium carbonate, an aqueous solution of potassium carbonate, and aqueous ammonia. Preferred is an aqueous solution of sodium hydrogencarbonate or aqueous ammonia.

The poor solvent used in the liquid separating operations is separable from the good solvent which dissolves the peptide therein, and, for example, in the case of using an aliphatic hydrocarbon as the good solvent, examples of the poor solvents include nitrile solvents, alcohol solvents, and amide solvents. In the case of using an aliphatic hydrocarbon as the good solvent, the poor solvent is preferably a nitrile solvent or an amide solvent, and, in the case of using heptane or hexane as the good solvent, the poor solvent is more preferably acetonitrile or N,N-dimethylformamide.

Steps (v) to (vii): Peptide Chain Elongation Steps

With respect to the peptide obtained in step (iv), the peptide chain can be further elongated by repeating a cycle of the following steps (v) to (vii) desired times:

(v) removing the N-terminal protective group of the peptide obtained in the purification step;

(vi) causing condensation of an N-protected amino acid or an N-protected peptide and the N-terminus of the C-protected peptide obtained in step (v) above; and (vii) purifying the peptide obtained in step (v) and/or (vi) above by precipitation or separation.

All these steps can be conducted by the same operations as those of the above-mentioned steps (ii) to (iv).

In the present method, the purification step in step (iv) or step (vii) can be appropriately omitted as long as such omission does not adversely affect the reaction in the next step.

Step (ix): C-Terminal Deprotection Step

The present step is the step of removing the C-terminal protective group from the peptide isolated by the purification step in step (iv) or (vii) above.

The reaction in the step is conducted by performing a reaction using a reagent, such as a fluorinating agent, in a solvent which does not adversely affect the reaction.

Examples of the solvent which does not adversely affect the reaction include alcohol solvents, halogen-containing hydrocarbon solvents, aromatic hydrocarbon solvents, ether solvents, amide solvents, and nitrile solvents. Preferred is an ether solvent, an amide solvent, or a nitrile solvent, and more preferred is tetrahydrofuran, N,N-dimethylformamide, or acetonitrile.

Examples of the fluorinating agents used in the reaction include hydrogen fluoride amine salts (for example, tetrabutylammonium fluoride, a hydrogen fluoride-pyridine complex, and a hydrogen fluoride-triethylamine complex) and hydrogen fluoride metal salts (for example, potassium fluoride, cesium fluoride, and calcium fluoride). Preferred is a hydrogen fluoride amine salt, and more preferred is tetrabutylammonium fluoride.

When the reaction is conducted, the reaction temperature is generally an arbitrary temperature in the range of from −20° C. to the boiling point of the solvent used, preferably 0 to 60° C., more preferably 10 to 40° C. Further, the reaction time is generally 1 to 24 hours, preferably 1 to 5 hours.

In each reaction, when the reaction substrate has a hydroxyl group, a mercapto group, an amino group, a carboxy group, or a carbonyl group (particularly has a functional group at a side chain of the amino acid or peptide), a protective group generally used in peptide chemistry and others may be introduced into the above group, and, if necessary, the protective group is removed after the reaction, so that an intended compound can be obtained.

The protection and deprotection can be performed using a generally known protective group by conducting a reaction for protection or deprotection (see, for example, Protective Groups in Organic Synthesis, Fourth edition, written by T. W. Greene, John Wiley & Sons Inc.) (2006)).

EXAMPLES

Hereinbelow, the present invention will be described in more detail with reference to the following Reference Synthesis Examples and Synthesis Examples, which should not be construed as limiting the scope of the present invention.

In the present specification, when amino acids and others are indicated by abbreviations, the individual indications are based on the abbreviations according to IUPAC-IUB Commission on Biochemical Nomenclature or the abbreviations commonly used in the corresponding field.

In the Synthesis Examples, "M" means mol/L.

In proton nuclear magnetic resonance ($^1$H-NMR) in the Examples, unless otherwise specified, the measurement was made using JNM-ECP300, manufactured by JEOL Ltd., and using deuterated chloroform, and a chemical shift was expressed as a δ value (ppm), as measured using tetramethylsilane as an internal standard (0.0 ppm).

In the descriptions of the NMR spectrum, "m" means multiplet, and "CDCl$_3$" means deuterated chloroform.

In high performance liquid chromatography/mass spectrometry, the measurement was made using any one of ACQUITY UPLC H-Class/QDa, manufactured by Waters Corporation, ACQUITY UPLC H-Class/SQD2, manufactured by Waters Corporation, and LC-20AD/Triple Tof5600, manufactured by Shimadzu Corporation, unless otherwise specified.

In mass spectrometry (MS), MALDI-TOF-MS, manufactured by Bruker Analytik GmbH, was used unless otherwise specified. As a matrix, α-cyano-4-hydroxycinnamic acid (CHCA) or 2,5-dihydroxybenzoic acid (DHB) was used unless otherwise specified.

In the descriptions of the high performance liquid chromatography/mass spectrometry, "ESI+" indicates a positive mode of an electrospray ionization method, "M+H" means a protonated molecule, "M+Na" means a sodium adduct, and "2M+Na" means a sodium adduct of dimer.

In the descriptions of the high performance liquid chromatography/mass spectrometry, "ESI−" indicates a negative mode of an electrospray ionization method, and "M−H" means a deprotonated molecule.

In the descriptions of the mass spectrometry, "M+H" means a protonated molecule, and "M+Na" means a sodium adduct.

In the purification by silica gel column chromatography, any one of Hi-Flash Columns, manufactured by Yamazen Corporation, SNAP Ultra Silica Cartridge, manufactured by Biotage Japan Ltd., Silica gel 60, manufactured by Merck & Co., Inc., and PSQ60B, manufactured by Fuji Silysia Chemical Ltd., was used unless otherwise specified.

Synthesis Example 1: Synthesis of 2-((3-((2-(4,4-dimethylpentan-2-yl)-5,7,7-trimethyloctyl)oxy)propyl)diethylsilyl)ethanol (FESE-OH)

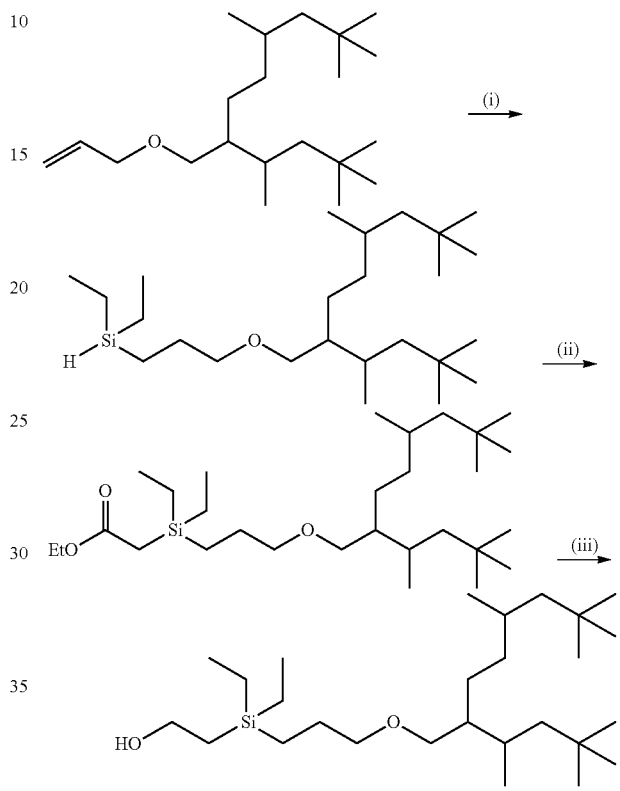

(i) 5-((Allyloxy)methyl)-2,2,4,8,10,10-hexamethylundecane (5.0 g, 16 mmol), which had been obtained by the method described in International Patent Application Publication No. 2018/207735, and diethylsilane (3.4 g, 39 mmol) were mixed with toluene (51 g), and chlorotris(triphenylphosphine)rhodium (0.09 g, 0.10 mmol) was added at room temperature and the resultant mixture was stirred for 2 hours. The resultant reaction mixture was diluted with toluene, and then washed with a saturated aqueous solution of sodium chloride. The resultant organic layer was concentrated, and then subjected to purification by silica gel column chromatography to obtain (3-((2-(4,4-dimethylpentan-2-yl)-5,7,7-trimethyloctyl)oxy)propyl)diethylsilane (4.9 g, 12 mmol) as a colorless oily material in a yield of 75%.

(ii) (3-((2-(4,4-Dimethylpentan-2-yl)-5,7,7-trimethyloctyl)oxy)propyl)diethylsilane (4.6 g, 12 mmol) and rhodium acetate (0.11 g, 0.25 mmol) were mixed with methylene chloride (50 g), and a 15% toluene solution of ethyl diazoacetate (12 g, 15 mmol) was dropwise added at room temperature and the resultant mixture was stirred for 4 hours. The resultant reaction mixture was diluted with methyl-t-butyl ether, and then successively washed with a saturated aqueous solution of sodium hydrogencarbonate, a saturated aqueous solution of ammonium chloride, and a saturated aqueous solution of sodium chloride. The resultant organic layer was concentrated, and then subjected to purification by silica gel column chromatography to obtain ethyl-2-((3-((2-(4,4-dimethylpentan-2-yl)-5,7,7-trimethyloctyl)oxy)propyl)diethylsilyl)acetate (5.3 g) as a pale yellow oily material.

(iii) The above-obtained ethyl-2-((3-((2-(4,4-dimethylpentan-2-yl)-5,7,7-trimethyloctyl)oxy)propyl)diethylsilyl)acetate (5.0 g) was mixed with tetrahydrofuran (40 g), and a 2 M tetrahydrofuran solution of tetrahydro-lithium-aluminum (4.0 mL, 8 mmol) was dropwise added at room temperature and the resultant mixture was stirred for one hour. The resultant reaction mixture was diluted with methyl-t-butyl ether, and then successively washed with a saturated aqueous solution of sodium hydrogencarbonate, a saturated aqueous solution of ammonium chloride, and a saturated aqueous solution of sodium chloride. The resultant organic layer was concentrated, and then subjected to purification by silica gel column chromatography to obtain FESE-OH (2.4 g, 5.4 mmol) as a colorless oily material in a two-step yield of 48%.

$^1$H-NMR (CDCl$_3$)

δ ppm: 0.50-0.58 (6H, m), 0.83-1.06 (32H, m), 1.09-1.33 (6H, m), 1.38-1.61 (6H, m), 1.67-1.83 (1H, m), 3.18-3.40 (4H, m), 3.70-3.76 (2H, m)

Reference Synthesis Example 1: Synthesis of Cbz-Phe-OFESE

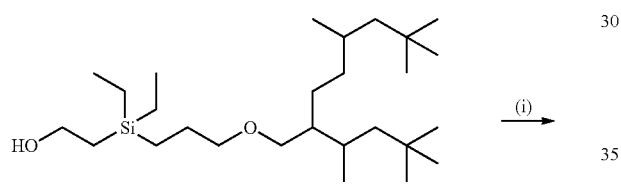

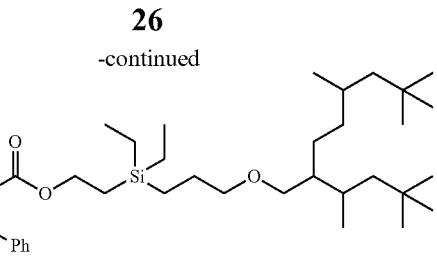

(i) FESE-OH (1.0 g, 2.3 mmol) and Cbz-Phe-OH (0.82 g, 2.7 mmol) were mixed with methylene chloride (10 g) and cooled to 0° C., and then 1-ethyl-3-(3-dimethylaminopropyl)carbodiimide hydrochloride (0.53 g, 2.8 mmol) and N,N-dimethyl-4-aminopyridine (0.01 g, 0.08 mmol) were added and the resultant mixture was stirred for one hour. The resultant reaction mixture was increased in temperature to room temperature and stirred for 2 hours. The resultant reaction mixture was diluted with methyl-t-butyl ether, and then successively washed with a saturated aqueous solution of sodium hydrogencarbonate, a saturated aqueous solution of ammonium chloride, and a saturated aqueous solution of sodium chloride. The resultant organic layer was concentrated, and then subjected to purification by silica gel column chromatography to obtain Cbz-Phe-OFESE (1.6 g, 2.2 mmol) as a colorless oily material in a yield of 96%.

MS (ESI−) m/z; 722.65 (M−H)

Synthesis Example 2: Synthesis of Fmoc-Phe-Phe-OFESE

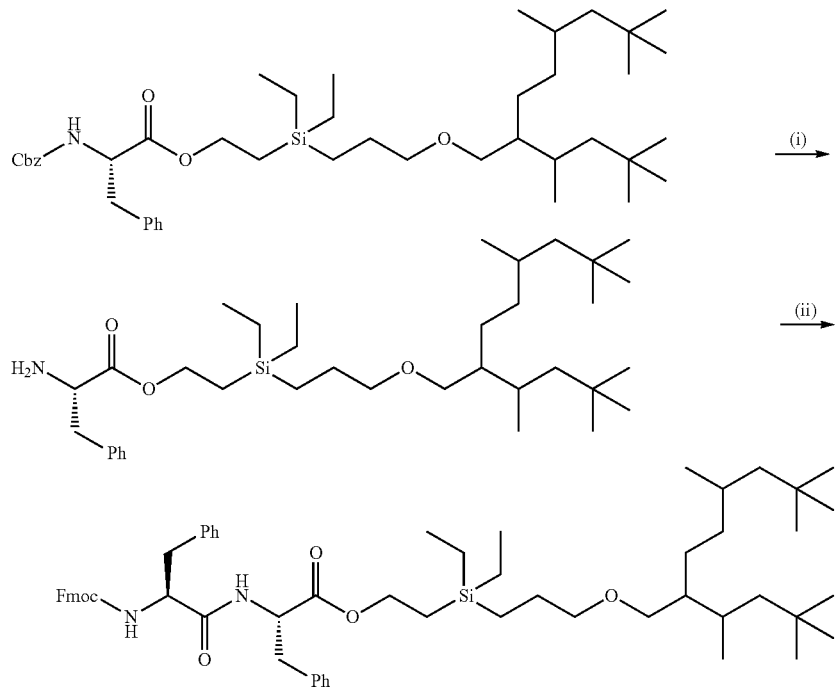

(i) Cbz-Phe-OFESE (1.2 g, 1.7 mmol) and 10% by mass Pd—C (0.2 g) were mixed with tetrahydrofuran (24 g), and the resultant mixture was stirred in a hydrogen gas atmosphere at room temperature for 17 hours. The resultant reaction mixture was subjected to filtration, and then the resultant filtrate was concentrated to obtain H-Phe-OFESE (1.1 g) as a black oily material.

(ii) The above-obtained H-Phe-OFESE (1.1 g) and Fmoc-Phe-OH (0.79, 2.0 mmol) were mixed with methylene chloride (10 g) and cooled to 0° C., and then N,N-diisopropylethylamine (0.32 g, 2.5 mmol) and (1-cyano-2-ethoxy-2-oxoethylideneaminooxy)dimethylamino-morpholino-carbenium hexafluorophosphate (0.93 g, 2.2 mmol) were added and the resultant mixture was stirred for 2 hours. The resultant reaction mixture was diluted with methyl-t-butyl ether, and then successively washed with a saturated aqueous solution of sodium hydrogencarbonate, a saturated aqueous solution of ammonium chloride, and a saturated aqueous solution of sodium chloride. The resultant organic layer was concentrated, and then subjected to purification by silica gel column chromatography to obtain Fmoc-Phe-Phe-OFESE (1.5 g, 1.6 mmol) as a white solid in a two-step yield of 94%.

MS (ESI+) m/z; 959.65 (M+H)+

Synthesis Example 3: Synthesis of Cbz-Ser(t-Bu)-Phe-OFESE added and the resultant mixture was increased in temperature to room temperature and stirred for 1.5 hours. N,N-Dimethyl-1,3-propanediamine (2.3 g, 23 mmol) was added to the resultant reaction mixture, and the mixture was stirred at room temperature for 17 hours. The resultant reaction mixture was diluted with ethyl acetate, and then successively washed with a 5% by mass aqueous solution of ammonium, a 10% by mass aqueous solution of potassium hydrogensulfate, and a 5% by mass aqueous solution of sodium chloride. The resultant organic layer was concentrated to obtain H-Phe-OFESE (2.8 g) as a colorless oily material.

MS (ESI+) m/z; 590.45 (M+H)+

(ii) The above-obtained H-Phe-OFESE (2.8 g) and Cbz-Ser(t-Bu)—OH (0.86, 2.9 mmol) were mixed with methylene chloride (13 g) and cooled to 0° C., and then 1-ethyl-3-dimethylaminopropylcarbodiimide hydrochloride (0.56 g, 2.9 mmol) was added and the resultant mixture was stirred at room temperature for 3 hours. Cbz-Ser(t-Bu)—OH (0.36, 1.2 mmol) and 1-ethyl-3-dimethylaminopropylcarbodiimide hydrochloride (0.26 g, 1.4 mmol) were further added to the resultant reaction mixture, and the mixture was stirred at room temperature for one hour. The resultant reaction mixture was diluted with ethyl acetate, and then successively washed with a 5% by mass aqueous solution of ammonium, a 10% by mass aqueous solution of potassium hydrogensulfate, and a 5% by mass aqueous

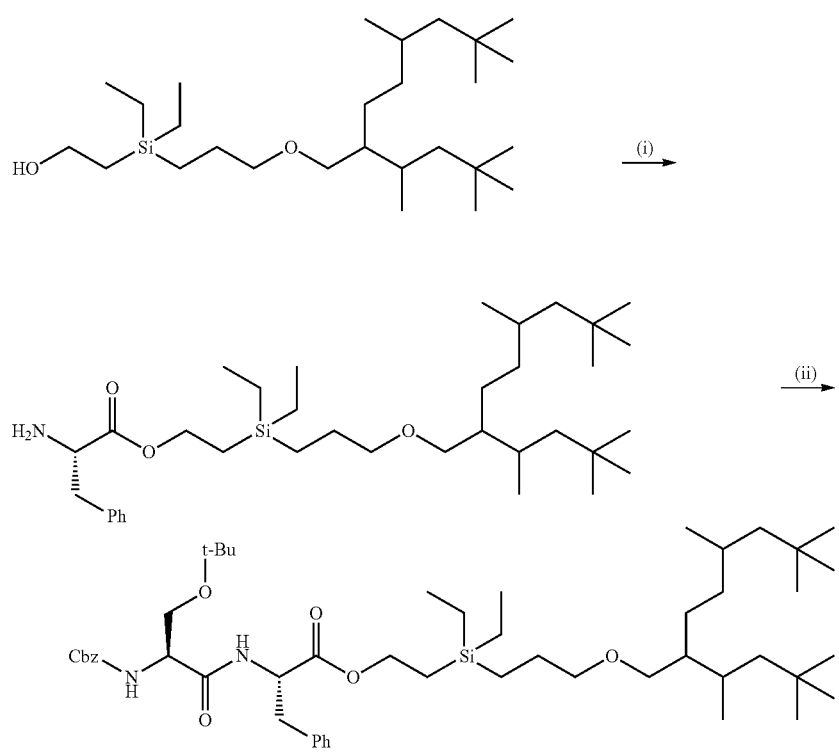

(i) FESE-OH (1.0 g, 2.3 mmol) and Fmoc-Phe-OH (1.2 g, 3.1 mmol) were mixed with methylene chloride (10 g) and N-methylpyrrolidone (4.0 g) and cooled to 0° C., and then 1-ethyl-3-(3-dimethylaminopropyl)carbodiimide hydrochloride (0.52 g, 2.7 mmol) and N,N-dimethyl-4-aminopyridine (0.003 g, 0.02 mmol) were solution of sodium chloride. The resultant organic layer was concentrated, and then subjected to purification by column chromatography to obtain Cbz-Ser(t-Bu)-Phe-OFESE (1.9 g, 2.2 mmol) as a colorless oily material in a three-step yield of 96%.

MS (ESI+) m/z; 867.55 (M+H)+

Synthesis Example 4: Synthesis of Cbz-Ser(t-Bu)-Phe-OH

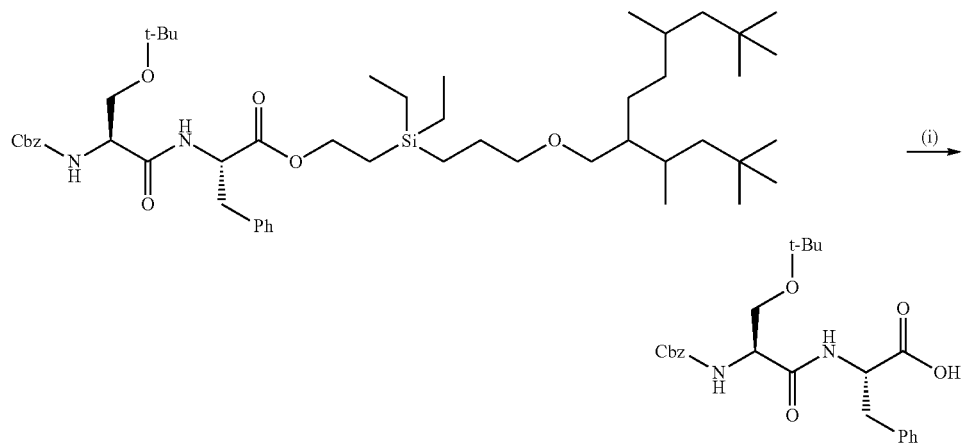

(i) Cbz-Ser(t-Bu)-Phe-OFESE (0.31 g, 0.36 mmol) was mixed with N,N-dimethylformamide (6.0 g), and a 1 M tetrahydrofuran solution of tetrabutylammonium fluoride (0.53 mL, 0.53 mmol) was added at room temperature, and the resultant mixture was stirred at room temperature for 24 hours. Water (6.0 g) was added to the resultant reaction mixture, and the mixture was washed with hexane (6.0 g) twice. The resultant aqueous layer was diluted with ethyl acetate, and washed with a 10% by mass aqueous solution of potassium hydrogensulfate and a saturated aqueous solution of sodium chloride. The resultant organic layer was concentrated to obtain Cbz-Ser(t-Bu)-Phe-OH (0.15 g, 0.34 mmol) as a white solid in a yield of 94%.

MS (ESI+) m/z; 443.10 (M+H)+

Synthesis Example 5: Synthesis of Cbz-Ser(t-Bu)-Dap(Boc)-Val-Pro-Phe-Phe-OFESE

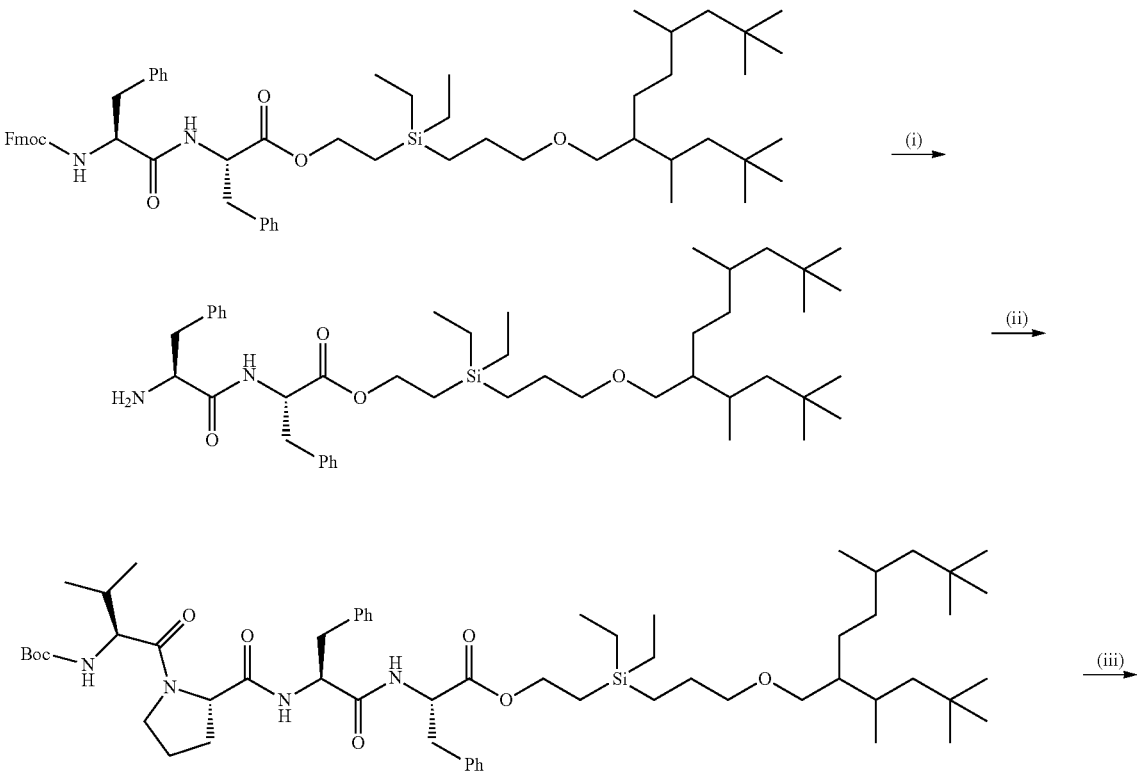

-continued

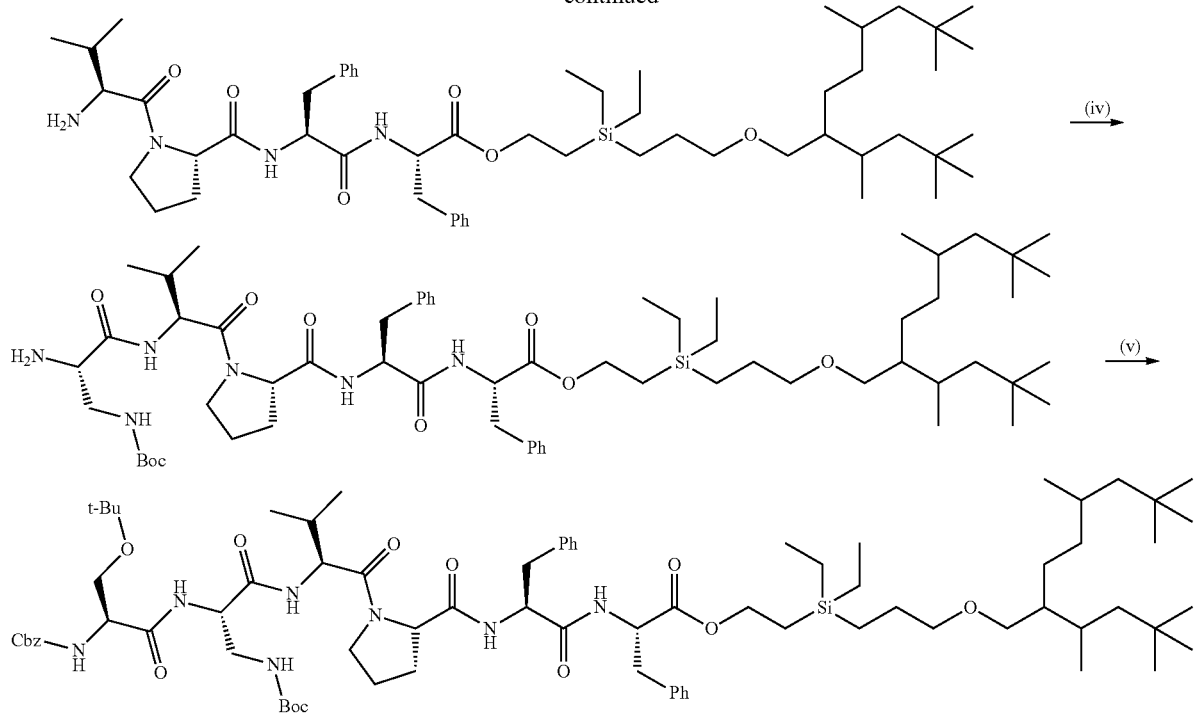

(i) Fmoc-Phe-Phe-OFESE (0.51 g, 0.53 mmol) was mixed with cyclopentyl methyl ether (10 g), and diazabicycloundecene (0.02 g, 0.13 mmol) was added at room temperature and the resultant mixture was stirred for 2 hours. The resultant reaction mixture was diluted with ethyl acetate, and then successively washed with a saturated aqueous solution of ammonium chloride and a saturated aqueous solution of sodium chloride. The resultant organic layer was concentrated to obtain H-Phe-Phe-OFESE (0.49 g) as a colorless oily material.

MS (ESI−) m/z; 735.60 (M−H)+

(ii) The above-obtained H-Phe-Phe-OFESE (0.49 g) and Boc-Val-Pro-OH (0.20, 0.64 mmol) were mixed with cyclopentyl methyl ether (4.6 g) and N-methylpyrrolidone (1.0 g), and cooled to 0° C., and then (1-cyano-2-ethoxy-2-oxoethylideneaminooxy)dimethylamino-morpholino-carbenium hexafluorophosphate (0.31 g, 0.72 mmol) and N,N-diisopropylethylamine (0.10 g, 0.77 mmol) were added and the resultant mixture was stirred for one hour. The resultant reaction mixture was increased in temperature to room temperature and stirred for 2 hours. The resultant reaction mixture was diluted with cyclopentyl methyl ether, and then successively washed with a 5% by mass aqueous solution of ammonium, a 10% by mass aqueous solution of potassium hydrogensulfate, and a saturated aqueous solution of sodium chloride. The resultant organic layer was concentrated, and then subjected to purification by silica gel column chromatography to obtain Boc-Val-Pro-Phe-Phe-OFESE (0.50 g, 0.48 mmol) as a white solid in a two-step yield of 91%.

MS (ESI+) m/z; 1033.75 (M+H)+

(iii) Boc-Val-Pro-Phe-Phe-OFESE (0.30 g, 0.29 mmol) was mixed with ethyl acetate (3.0 g), and 4 M hydrogen chloride-ethyl acetate (2.9 mL, 12 mmol) was added at room temperature and the resultant mixture was stirred at 0° C. for one hour. The resultant reaction mixture was diluted with ethyl acetate, and then successively washed with a saturated aqueous solution of sodium hydrogencarbonate and a saturated aqueous solution of sodium chloride. The resultant organic layer was concentrated to obtain H-Val-Pro-Phe-Phe-OFESE (0.27 g) as a white solid.

MS (ESI−) m/z; 931.75 (M−H)+

(iv) The above-obtained H-Val-Pro-Phe-Phe-OFESE (0.25 g) and Fmoc-Dap(Boc)-OH (0.15, 0.35 mmol) were mixed with ethyl acetate (5.4 g) and cooled to 0° C., and then a 50% by mass ethyl acetate solution of AllessanCAP (registered trademark) (0.50 g, 0.58 mmol) and N,N-diisopropylethylamine (0.30 g, 2.3 mmol) were added and the resultant mixture was stirred for 1.5 hours. The resultant reaction mixture was increased in temperature to room temperature, and N,N-dimethyl-1,3-propanediamine (0.84 g, 8.2 mmol) was added and the resultant mixture was stirred for 21 hours. The resultant reaction mixture was diluted with ethyl acetate, and then successively washed with a 5% by mass aqueous solution of ammonium, a 10% by mass aqueous solution of potassium hydrogensulfate, and a saturated aqueous solution of sodium chloride. The resultant organic layer was concentrated to obtain H-Dap(Boc)-Val-Pro-Phe-Phe-OFESE (0.35 g) as a yellow oily material.

(v) The above-obtained H-Dap(Boc)-Val-Pro-Phe-Phe-OFESE (0.35 g) and Cbz-Ser(t-Bu)—OH (0.11, 0.37 mmol) were mixed with toluene (4.0 g) and cooled to 0° C., and then (1-cyano-2-ethoxy-2-oxoethylideneaminooxy)dimethylamino-morpholino-carbenium hexafluorophosphate (0.17 g, 0.40 mmol) and N,N-diisopropylethylamine (0.05 g, 0.43 mmol) were added and the resultant mixture was stirred for one hour. The resultant reaction mixture was increased in temperature to room temperature and stirred for 19 hours. The resultant reaction mixture was diluted with ethyl acetate, and then successively washed with a saturated aqueous solution of sodium hydrogencarbonate, a 10% by mass aqueous solution of potassium hydrogensulfate, and a saturated aqueous solution of sodium chloride. The resultant organic layer was concentrated, and ethyl acetate (3 mL), hexane (2 mL), and aminosilica gel (manufactured by Fuji Silysia Chemical Ltd.) (0.06 g) were added and the resultant mixture was stirred, and subjected to filtration. The resultant filtrate was concentrated, and then subjected to purification by silica gel column chromatography to obtain Cbz-Ser(t-Bu)-Dap(Boc)-Val-Pro-Phe-Phe-OFESE (0.30 g, 0.21 mmol) as a white solid in a four-step yield of 78%.
MS (ESI+) m/z; 1397.10 (M+H)+

Reference Synthesis Example 2: Synthesis of Cbz-Phe-ODMSE

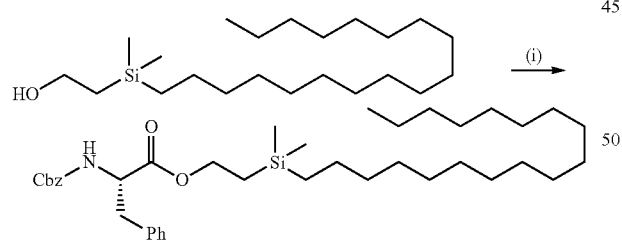

(i) 2-(Dimethyl(octadecyl)silyl)ethanol (0.50 g, 1.4 mmol), which had been obtained by the method described in International Patent Application Publication No. 2011/134675, and Cbz-Phe-OH (0.50 g, 1.7 mmol) were mixed with methylene chloride (5.0 g), and 1-ethyl-3-(3-dimethylaminopropyl)carbodiimide hydrochloride (0.33 g, 1.7 mmol) and N,N-dimethyl-4-aminopyridine (0.01 g, 0.08 mmol) were added at room temperature and the resultant mixture was stirred for 5.5 hours. The resultant reaction mixture was diluted with methyl-t-butyl ether, and then successively washed with a saturated aqueous solution of ammonium chloride, a saturated aqueous solution of sodium hydrogencarbonate, and a saturated aqueous solution of sodium chloride. The resultant organic layer was concentrated, and then subjected to purification by silica gel column chromatography to obtain Cbz-Phe-ODMSE (0.83 g, 1.3 mmol) as a colorless oily material in a yield of 93%.
MS (ESI−) m/z; 636.55 (M−H)+

Synthesis Example 6: Synthesis of Fmoc-Phe-Phe-ODMSE

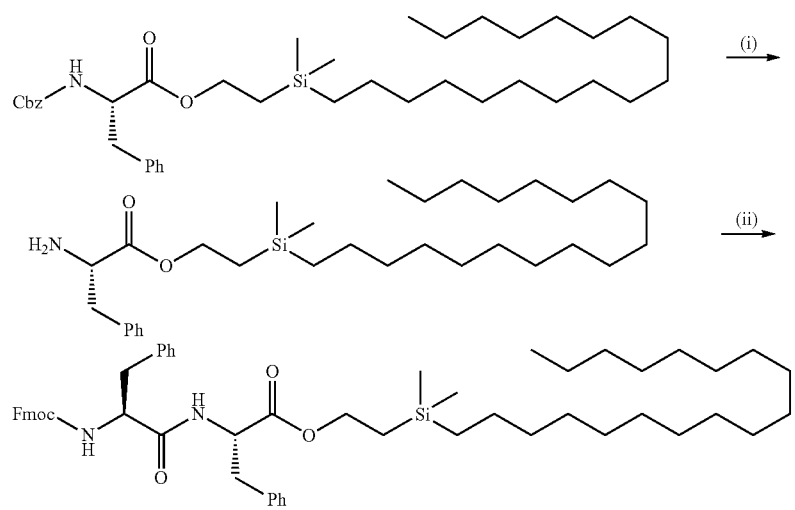

(i) Cbz-Phe-ODMSE (0.70 g, 1.1 mmol) and 10% by mass Pd—C (0.09 g) were mixed with ethyl acetate (14 g), and the resultant mixture was stirred in a hydrogen gas atmosphere at room temperature for 25 hours. The resultant reaction mixture was subjected to filtration, and then the resultant filtrate was concentrated to obtain H-Phe-ODMSE (0.58 g) as a black oily material.

(ii) The above-obtained H-Phe-ODMSE (0.58 g) and Fmoc-Phe-OH (0.51 g, 1.3 mmol) were mixed with methylene chloride (5.6 g) and cooled to 0° C., and then N,N-diisopropylethylamine (0.21 g, 1.6 mmol) and (1-cyano-2-ethoxy-2-oxoethylideneaminooxy)dimethylamino-morpholino-carbenium hexafluorophosphate (0.61 g, 1.4 mmol) were added and the resultant mixture was stirred for one hour. The resultant reaction mixture was increased in temperature to room temperature and stirred for one hour. The resultant reaction mixture was diluted with ethyl acetate, and then successively washed with a saturated aqueous solution of sodium hydrogencarbonate, a saturated aqueous solution of ammonium chloride, and a saturated aqueous solution of sodium chloride. The resultant organic layer was concentrated, and then subjected to purification by silica gel column chromatography to obtain Fmoc-Phe-Phe-ODMSE (0.91 g, 1.0 mmol) as a white solid in a two-step yield of 91%.
MS (ESI+) m/z; 873.60 (M+H)+

Reference Synthesis Example 3: Synthesis of Fmoc-Phe-Phe-OTMSE

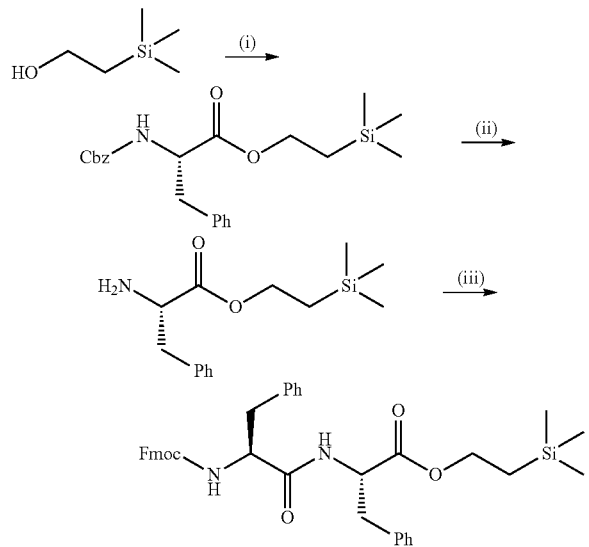

(i) Trimethylsilylethanol (0.24 g, 2.0 mmol) and Cbz-Phe-OH (0.50 g, 1.7 mmol) were mixed with methylene chloride (5.3 g), and 1-ethyl-3-(3-dimethylaminopropyl)carbodiimide hydrochloride (0.38 g, 2.0 mmol) and N,N-dimethyl-4-aminopyridine (0.002 g, 0.02 mmol) were added at room temperature and the resultant mixture was stirred for 24 hours. The resultant reaction mixture was diluted with ethyl acetate, and then successively washed with a saturated aqueous solution of sodium hydrogencarbonate, a saturated aqueous solution of ammonium chloride, and a saturated aqueous solution of sodium chloride. The resultant organic layer was concentrated, and then subjected to purification by silica gel column chromatography to obtain Cbz-Phe-OTMSE (0.39 g, 0.98 mmol) as a white solid in a yield of 49%.

(ii) Cbz-Phe-OTMSE (0.27 g, 0.68 mmol) and 10% by mass Pd—C (0.04 g) were mixed with tetrahydrofuran (5.3 g), and the resultant mixture was stirred in a hydrogen gas atmosphere at room temperature for 24 hours. The resultant reaction mixture was subjected to filtration, and then the resultant filtrate was concentrated to obtain H-Phe-OTMSE (0.18 g) as a black oily material.

(iii) The above-obtained H-Phe-OTMSE (0.18 g) and Fmoc-Phe-OH (0.31 g, 0.80 mmol) were mixed with methylene chloride (4.0 g) and cooled to 0° C., and then N,N-diisopropylethylamine (0.21 g, 1.7 mmol) and (1-cyano-2-ethoxy-2-oxoethylideneaminooxy)dimethylamino-morpholino-carbenium hexafluorophosphate (0.35 g, 0.82 mmol) were added and the resultant mixture was stirred for one hour. The resultant reaction mixture was increased in temperature to room temperature and stirred for 3 hours. The resultant reaction mixture was diluted with ethyl acetate, and then successively washed with a saturated aqueous solution of sodium hydrogencarbonate, a saturated aqueous solution of ammonium chloride, and a saturated aqueous solution of sodium chloride. The resultant organic layer was concentrated, and then subjected to purification by silica gel column chromatography to obtain Fmoc-Phe-Phe-OTMSE (0.39 g, 0.61 mmol) as a white solid in a two-step yield of 90%.

MS (ESI+) m/z; 635.35 (M+H)+

Test Example 1: Evaluation of the Solubility in an Organic Solvent

[Test Compound]

In the measurement of the solubility, the compounds obtained in Synthesis Examples 2 and 6 and Reference Synthesis Example 3 were used.

[Method for Test]

A test compound was dissolved in toluene, cyclopentyl methyl ether, or ethyl acetate so as to be saturated, and stirred at 20° C. for one hour or longer. The obtained solution was subjected to centrifugal filtration, and then the resultant filtrate was subjected to analysis under the below-shown conditions for measurement, determining an amount of the test compound dissolved.

[Conditions for Measurement]

High performance liquid chromatography: HPLC-20A, manufactured by SHIMADZU Corporation Column: XBridge C18 (2.5 μm, 4.6×100 mm)

Column oven temperature: 40° C.

Eluent: A=0.2 vol % aqueous solution of trifluoroacetic acid

B=0.2 vol % acetonitrile solution of trifluoroacetic acid

AB=50/50 (0 to 2 minutes), 50/50 to 0/100 (2 to 15 minutes), 0/100 (15 to 40 minutes)

Eluent flow rate: 1.0 mL/minute

Wavelength for detection: 210 nm

[Results of Test]

The amount of the compound dissolved in 100 g of each organic solvent is shown in Table 1. The compounds in Synthesis Examples 2 and 6 were improved in the solubility in toluene, cyclopentyl methyl ether, and ethyl acetate, as compared to the compound in Reference Synthesis Example 3.

TABLE 1

| Organic solvent | Synthesis Example 2 | Synthesis Example 6 | Reference Synthesis Example 3 |
| --- | --- | --- | --- |
| Toluene | 116 g | 38 g | 0.87 g |
| Cyclopentyl methyl ether | 111 g | 41 g | 1.4 g |
| Ethyl acetate | 97 g | 8.4 g | 4.5 g |

Synthesis Example 7: Synthesis of 2-((3-((2-(4,4-dimethylpentan-2-yl)-5,7,7-trimethyloctyl)oxy)propyl)diphenylsilyl)ethanol (FPSE-OH)

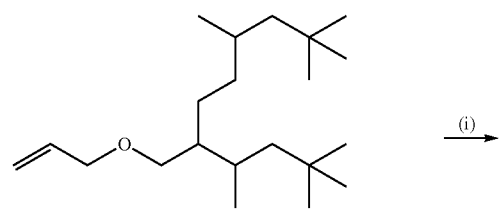

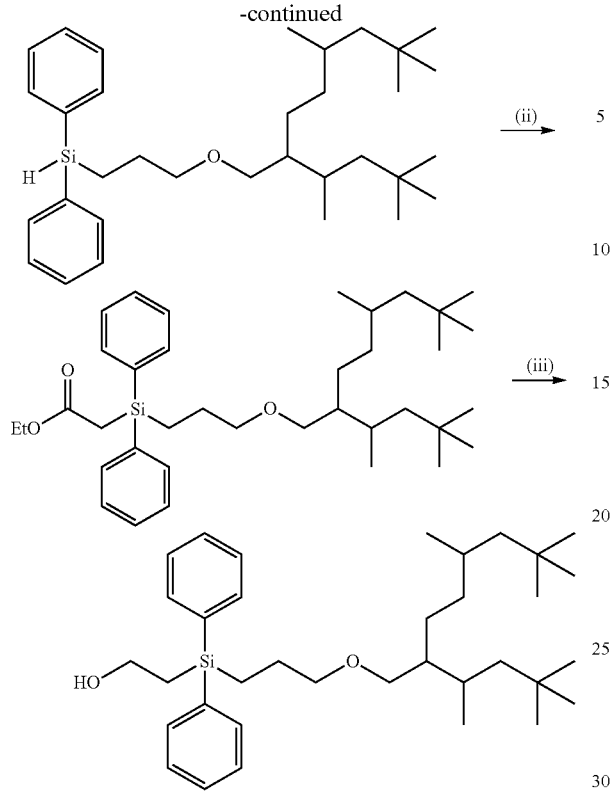

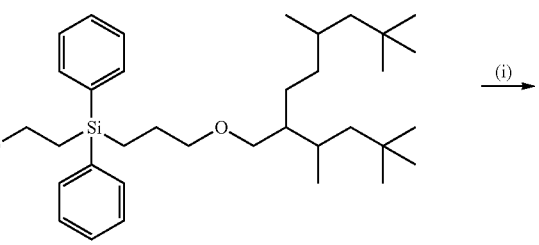

(i) 5-((Allyloxy)methyl)-2,2,4,8,10,10-hexamethylundecane (10.1 g, 33 mmol), which had been obtained by the method described in International Patent Application Publication No. 2018/207735, and diphenylsilane (11.9 g, 65 mmol) were mixed with toluene (100 g), and chlorotris(triphenylphosphine)rhodium (0.1 g, 0.10 mmol) was added at room temperature and the resultant mixture was stirred for 2 hours. The resultant reaction mixture was successively washed with a saturated aqueous solution of sodium hydrogencarbonate and a saturated aqueous solution of sodium chloride. The resultant organic layer was concentrated, and then subjected to purification by silica gel column chromatography to obtain (3-((2-(4,4-dimethylpentan-2-yl)-5,7,7-trimethyloctyl)oxy)propyl)diphenylsilane (15.0 g, 30 mmol) as a colorless oily material in a yield of 91%.

(ii) (3-((2-(4,4-Dimethylpentan-2-yl)-5,7,7-trimethyloctyl)oxy)propyl)diphenylsilane (15.0 g, 30 mmol) and rhodium acetate (0.05 g, 0.10 mmol) were mixed with methylene chloride (150 g), and a 15% toluene solution of ethyl diazoacetate (47 g, 62 mmol) was dropwise added at room temperature and the resultant mixture was stirred for one hour. The resultant reaction mixture was diluted with methylene chloride, and then successively washed with a saturated aqueous solution of sodium hydrogencarbonate, a saturated aqueous solution of ammonium chloride, and a saturated aqueous solution of sodium chloride. The resultant organic layer was concentrated to obtain a pale yellow oily material (21.7 g).

(iii) The above-obtained pale yellow oily material (20.6 g) was mixed with tetrahydrofuran (30 g), and dropwise added to a mixture of tetrahydro-lithium-aluminum (1.0 g, 26 mmol) and tetrahydrofuran (27 g) at room temperature and the resultant mixture was stirred for one hour and 30 minutes. The resultant reaction mixture was diluted with ethyl acetate, and then successively washed with 1 M hydrochloric acid and a saturated aqueous solution of sodium chloride. The resultant organic layer was concentrated, and then subjected to purification by silica gel column chromatography to obtain FPSE-OH (4.84 g, 9.0 mmol) as a colorless oily material in a two-step yield of 32%.

$^1$H-NMR (CDCl$_3$)

δ ppm: 0.82-1.80 (41H, m), 3.14-3.41 (4H, m), 3.74-3.80 (2H, m), 7.31-7.41 (6H, m), 7.49-7.53 (2H, m)

MS (TOF-MS) m/z; 561.03 (M+Na)+

Reference Synthesis Example 4: Synthesis of Cbz-Phe-OFPSE

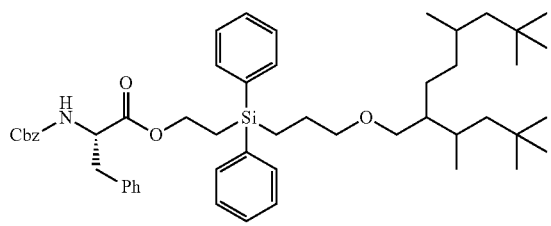

(i) FPSE-OH (2.0 g, 3.7 mmol) and Cbz-Phe-OH (1.3 g, 4.3 mmol) were mixed with methylene chloride (22 g), and cooled to 0° C., and then 1-ethyl-3-(3-dimethylaminopropyl)carbodiimide hydrochloride (0.90 g, 4.7 mmol) and N,N-dimethyl-4-aminopyridine (0.01 g, 0.08 mmol) were added and the resultant mixture was stirred for one hour. The resultant reaction mixture was diluted with ethyl acetate, and then successively washed with a saturated aqueous solution of ammonium chloride and a saturated aqueous solution of sodium chloride. The resultant organic layer was concentrated, and then subjected to purification by silica gel column chromatography to obtain Cbz-Phe-OFPSE (2.9 g, 3.5 mmol) as a colorless oily material in a yield of 96%.

MS (TOF-MS) m/z; 842.54 (M+Na)+

Synthesis Example 8: Synthesis of Fmoc-Phe-Phe-OFPSE

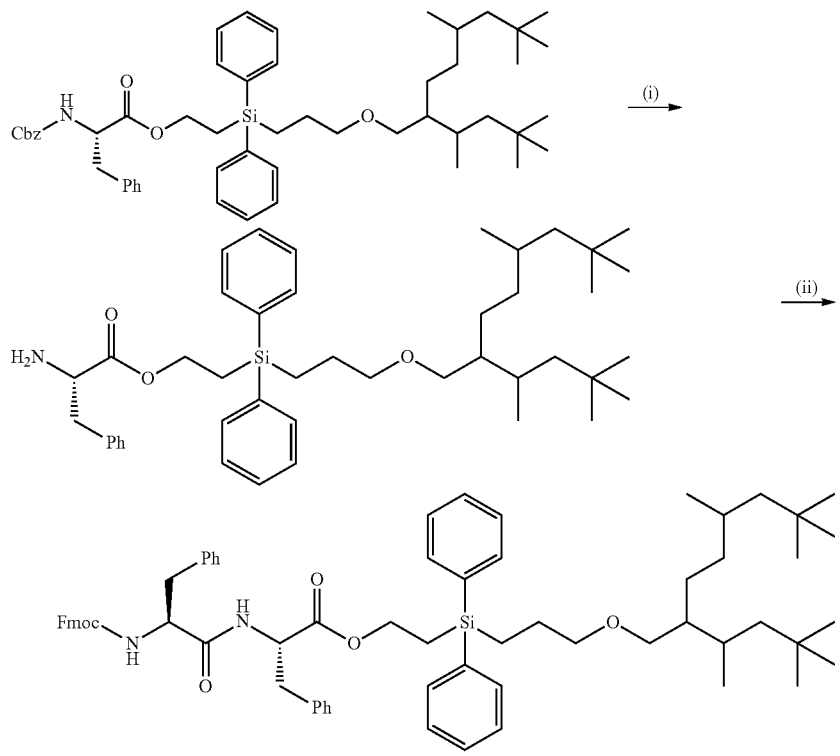

(i) Cbz-Phe-OFPSE (2.0 g, 2.4 mmol) and 10% by mass Pd—C (0.3 g) were mixed with 2,2,2-trifluoroethanol (30 g), and the resultant mixture was stirred in a hydrogen gas atmosphere at room temperature for 42 hours. The resultant reaction mixture was subjected to filtration, and then the resultant filtrate was concentrated to obtain H-Phe-OFPSE (1.6 g) as a colorless oily material in a yield of 98%.

(ii) H-Phe-OFPSE (1.5 g, 2.2 mmol) and Fmoc-Phe-OH (1.2, 3.1 mmol) were mixed with methylene chloride (20 g) and cooled to 0° C., and then N,N-dii sopropy-lethylamine (0.52 g, 4.0 mmol) and (1-cyano-2-ethoxy-2-oxoethylideneaminooxy)dimethylamino-morpholino-carbenium hexafluorophosphate (1.4 g, 3.3 mmol) were added and the resultant mixture was stirred for 2 hours. The resultant reaction mixture was diluted with ethyl acetate, and then successively washed with a 10% by mass aqueous solution of potassium hydrogensulfate, a 5% by mass aqueous solution of ammonia, and a 5% aqueous solution of sodium chloride. The resultant organic layer was concentrated, and then subjected to purification by silica gel column chromatography to obtain Fmoc-Phe-Phe-OFPSE (2.2 g, 2.1 mmol) as a white solid in a yield of 91%.

MS (TOF-MS) m/z; 1077.76 (M+Na)+

Test Example 2: Evaluation of the Solubility in an Organic Solvent

[Test Compound]

In the measurement of the solubility, the compound obtained in Synthesis Example 8 was used.

[Method for Test]

A test compound was dissolved in toluene, cyclopentyl methyl ether, or ethyl acetate, and stirred at 20° C. for one hour or longer. The obtained solution was subjected to centrifugal filtration, and then the resultant filtrate was subjected to analysis under the below-shown conditions for measurement, determining an amount of the test compound dissolved.

[Conditions for Measurement]

High performance liquid chromatography: HPLC-20A, manufactured by SHIMADZU Corporation Column: XBridge C18 (2.5 μm, 4.6×100 mm)

Column oven temperature: 40° C.

Eluent: A=0.2 vol % aqueous solution of trifluoroacetic acid

B=0.2 vol % acetonitrile solution of trifluoroacetic acid

AB=50/50 (0 to 2 minutes), 50/50 to 0/100 (2 to 15 minutes), 0/100 (15 to 40 minutes)

Eluent flow rate: 1.0 mL/minute

Wavelength for detection: 210 nm

[Results of Test]

The amount of the compound dissolved in 100 g of each organic solvent is shown in Table 2. The compound in Synthesis Example 8 was improved in the solubility in toluene, cyclopentyl methyl ether, and ethyl acetate, as compared to the compound in Reference Synthesis Example 3.

TABLE 2

| Organic solven | Synthesis Example 8 | Reference Synthesis Example 3 |
|---|---|---|
| Toluene | >140 g | 0.87 g |
| Cyclopentyl methyl ether | >140 g | 1.4 g |
| Ethyl acetate | >140 g | 4.5 g |

Reference Synthesis Example 5: Synthesis of 1-bromo-4-((2-(4,4-dimethylpentan-2-yl)-5,7,7-trimethyloctyl)oxy)-benzene

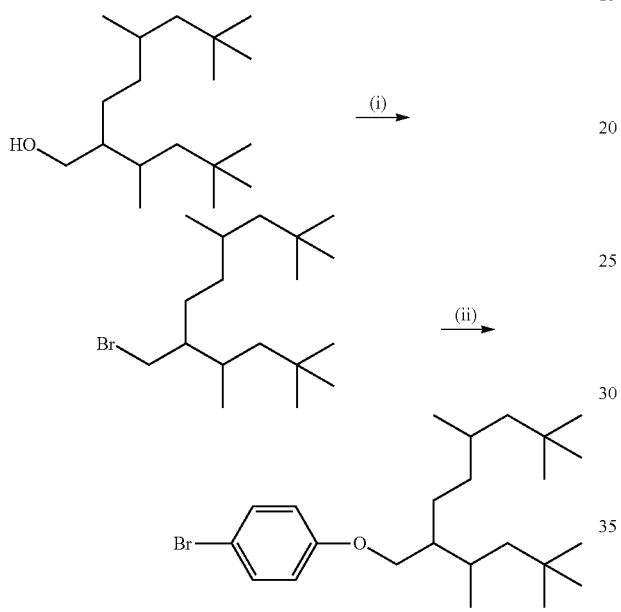

(i) 2-(4,4-Dimethylpentan-2-yl)-5,7,7-trimethyloctan-1-ol (5.0 g, 18.6 mmol) and triphenylphosphine (4.8 g, 18.3 mmol) were mixed with methylene chloride (50.0 g), and cooled to 0° C., and then N-bromosuccinimide (3.3 g, 18.5 mmol) was added and the resultant mixture was stirred for 3.5 hours. The resultant reaction mixture was concentrated, and then diluted with n-heptane (100 mL) and subjected to filtration by a silica gel short pad. The material collected by filtration was washed with n-heptane (100 mL), and the resultant filtrate was concentrated to obtain 5-(bromomethyl)-2,2,4,8,10,10-hexamethylundecane (5.3 g, 16.0 mmol) as a colorless oily material in a yield of 86%.

(ii) Potassium carbonate (1.2 g, 9.0 mmol) and 4-bromophenol (1.5 g, 8.9 mmol) were mixed with N,N-dimethylformamide (25.0 g), and 5-(bromomethyl)-2,2,4,8,10,10-hexamethylundecane (2.5 g, 7.5 mmol) was added at room temperature, and then the resultant mixture was increased in temperature to 120° C. and stirred for 22 hours. Water was added to the resultant reaction mixture and extracted with hexane, and then the resultant organic layer was concentrated, and subjected to purification by silica gel column chromatography to obtain (1-bromo-4-((2-(4,4-dimethylpentan-2-yl)-5,7,7-trimethyloctyl)oxy)-benzene (1.9 g, 4.4 mmol) as a colorless oily material in a yield of 59%.

$^1$H-NMR (CDCl$_3$)

δ ppm: 0.87-0.94 (23H, m), 1.00-1.08 (2H, m), 1.16-1.50 (8H, m), 1.59-1.69 (1H, m), 1.77-1.90 (1H, m), 3.71-3.86 (2H, m), 6.75-6.80 (2H, m), 7.33-7.37 (2H, m)

Synthesis Example 9: Synthesis of 2-((4-((2-(4,4-dimethylpentan-2-yl)-5,7,7-trimethyloctyl)-oxy)phenyl)dimethylsilyl)ethanol (MPSE-OH)

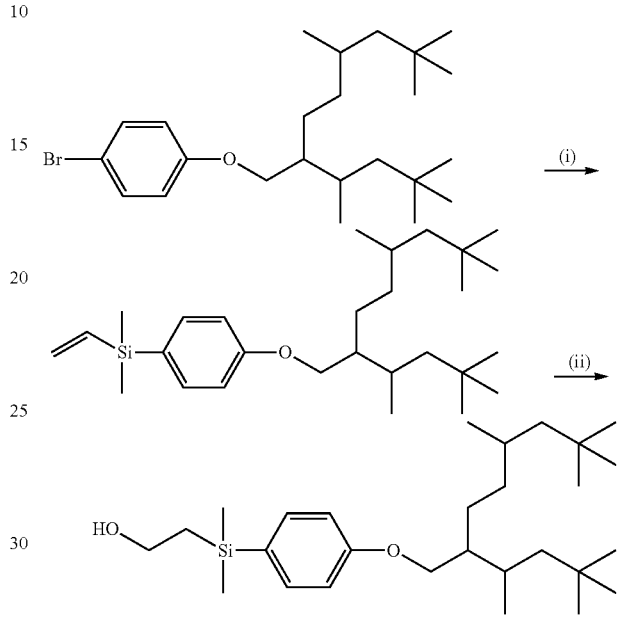

(i) 1-Bromo-4-((2-(4,4-dimethylpentan-2-yl)-5,7,7-trimethyloctyl)oxy)-benzene (0.50 g, 1.2 mmol) was mixed with tetrahydrofuran (5.0 g), and a 1.59 M hexane solution of n-butyllithium (0.9 mL, 1.4 mmol) was dropwise added at −78° C. and the resultant mixture was stirred for one hour. To the resultant reaction mixture was dropwise added a mixture of chlorodimethylvinylsilane (0.22 g, 1.8 mmol) and tetrahydrofuran (1.0 g) at −78° C., and the resultant mixture was stirred for 0.5 hour, and then increased in temperature to room temperature and stirred for 0.5 hour. Water was added to the resultant reaction mixture and extracted with ethyl acetate, and then the resultant organic layer was washed with a saturated aqueous solution of sodium chloride. The resultant organic layer was concentrated to obtain a (4-((2-(4,4-dimethylpentan-2-yl)-5,7,7-trimethyloctyl)-oxy)phenyl)dimethylvinylsilane crude product (0.50 g) as a colorless oily material.

(ii) The above-obtained 4-((2-(4,4-dimethylpentan-2-yl)-5,7,7-trimethyloctyl)-oxy)phenyl)dimethylvinylsilane crude product (0.2 g) was mixed with tetrahydrofuran (1.0 g), and dropwise added to a mixture of 9-borabicyclo[3.3.1]nonane dimer (0.17 g, 0.7 mmol) and tetrahydrofuran (1.0 g) at 0° C., and the resultant mixture was increased in temperature to room temperature and stirred for one hour. The resultant reaction mixture was cooled to 0° C., and a 30% by mass aqueous solution of sodium hydroxide (0.15 g, 1.1 mmol) and a 30% by mass aqueous solution of hydrogen peroxide (0.15 g, 1.3 mmol) were dropwise added, and then the resultant mixture was increased in temperature to room temperature and stirred for one hour. The resultant reaction mixture was diluted with ethyl acetate, and successively washed with a saturated aqueous solution of ammonium chloride and a saturated aqueous solution of sodium chloride. The resultant organic layer was concentrated, and then subjected to purification by silica gel column chromatography to obtain MPSE-OH (0.18 g, 0.4 mmol) as a colorless oily material in a two-step yield of 85%.

MS (ESI+) m/z; 471.36 (M+Na)+

Synthesis Example 10: Synthesis of 2-((4-((2-(4,4-dimethylpentan-2-yl)-5,7,7-trimethyloctyl)-oxy)phenyl)diphenylsilyl)ethanol (TPSE-OH)

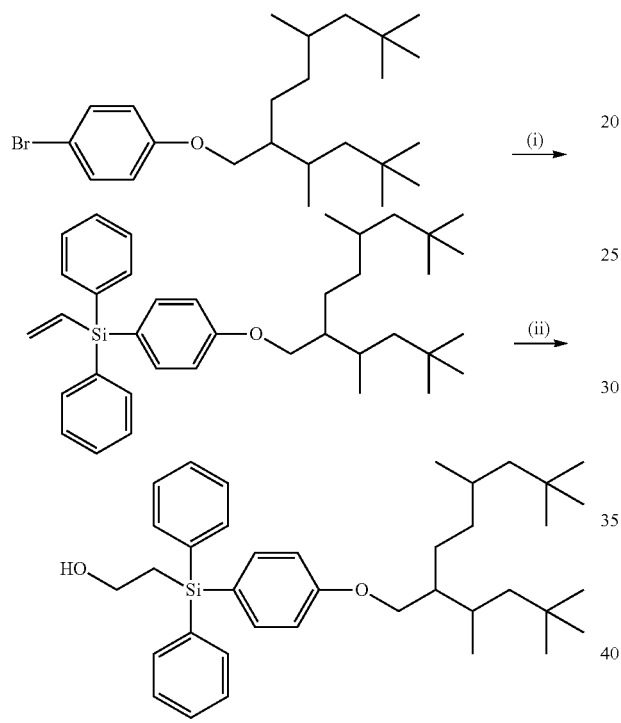

(i) 1-Bromo-4-((2-(4,4-dimethylpentan-2-yl)-5,7,7-trimethyloctyl)oxy)-benzene (0.55 g, 1.3 mmol) was mixed with tetrahydrofuran (3.6 g), and a 1.59 M hexane solution of n-butyllithium (1.1 mL, 1.4 mmol) was dropwise added at −78° C. and the resultant mixture was stirred for 1.5 hours. To the resultant reaction mixture was dropwise added a mixture of chlorodiphenylvinylsilane (0.47 g, 1.9 mmol) and tetrahydrofuran (1.1 g) at −78° C., and the resultant mixture was stirred for 20 minutes, and then increased in temperature to room temperature and stirred for 40 minutes. Water was added to the resultant reaction mixture and extracted with hexane, and then the resultant aqueous layer was further extracted with ethyl acetate. The resultant organic layer was washed with a 10% by mass aqueous solution of sodium chloride, and the resultant organic layer was concentrated, and then subjected to purification by silica gel column chromatography to obtain (4-((2-(4,4-dimethylpentan-2-yl)-5,7,7-trimethyloctyl)-oxy)phenyl)diphenylvinylsilane (0.64 g, 1.2 mmol) as a pale yellow oily material in a yield of 89%.

(ii) The above-obtained 4-((2-(4,4-dimethylpentan-2-yl)-5,7,7-trimethyloctyl)-oxy)phenyl)diphenylvinylsilane (0.25 g, 0.45 mmol) was mixed with tetrahydrofuran (1.8 g), and dropwise added to a mixture of 9-borabicyclo[3.3.1]nonane dimer (0.17 g, 0.76 mmol) and tetrahydrofuran (1.8 g) at 0° C., and the resultant mixture was increased in temperature to room temperature and stirred for 4 hours. After increasing the temperature to 45° C., 9-borabicyclo[3.3.1]nonane dimer (0.057 g, 0.25 mmol) was added and the resultant mixture was stirred for 0.5 hour. The resultant reaction mixture was cooled to 0° C., and a 30% by mass aqueous solution of sodium hydroxide (0.19 g, 1.4 mmol) and a 30% by mass aqueous solution of hydrogen peroxide (0.21 g, 1.9 mmol) were dropwise added, and then the resultant mixture was increased in temperature to room temperature and stirred for one hour. The resultant reaction mixture was diluted with ethyl acetate, and successively washed with a 10% by mass aqueous solution of sodium chloride and a saturated aqueous solution of ammonium chloride. The resultant organic layer was concentrated, and then subjected to purification by silica gel column chromatography to obtain TPSE-OH (0.13 g, 0.23 mmol) as a colorless oily material in a yield of 50%.

MS (ESI+) m/z; 1167.80 (2M+Na)+

INDUSTRIAL APPLICABILITY

By the present invention, a method for producing a peptide at high efficiency can be provided.

The invention claimed is:

1. A method for producing a peptide, comprising the steps of:
   (1) removing the N-terminal protective group of an amino acid or peptide compound represented by the following formula (I):

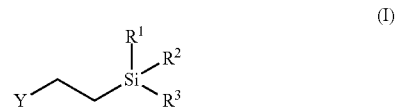

wherein

Y represents a residue of an N-protected amino acid or an N-protected peptide, and each of $R^1$, $R^2$, and $R^3$ independently represents an aliphatic hydrocarbon group which may have a substituent in which each of 1 to 5 methylene groups in the aliphatic hydrocarbon group may be independently replaced by a structure selected from the group consisting of —O—, —CO—, —N($R^6$)—, —N($R^7$)CO—, and —CON($R^8$)— or an aromatic hydrocarbon group which may have a substituent, wherein each of $R^6$, $R^7$, and $R^8$ independently represents a hydrogen atom or a $C_{1-6}$ alkyl group, wherein at least one of the $R^1$, $R^2$, and $R^3$ is an aliphatic hydrocarbon group which may have a substituent in which one methylene group in the aliphatic hydrocarbon group may be replaced by —O—, and 3 or more carbon atoms in the aliphatic hydrocarbon group are tertiary or quaternary carbon atoms;

wherein the total number of carbon atoms in the $R^1R^2R^3$Si group is 18 to 80, and the $R^1R^2R^3$SiCH$_2$CH$_2$ group is bonded to the C-terminus of the amino acid or peptide residue in Y;

and (2) causing condensation of an N-protected amino acid or an N-protected peptide and the N-terminus of the C-protected amino acid or C-protected peptide obtained in the step (1).

2. A method for producing a peptide, comprising the steps of:

(1) removing the N-terminal protective group of an amino acid or peptide compound represented by the following formula (I):

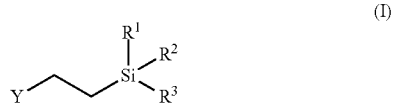

(I)

wherein

Y represents a residue of an N-protected amino acid or an N-protected peptide, and each of $R^1$, $R^2$, and $R^3$ independently represents an aliphatic hydrocarbon group which may have a substituent in which each of 1 to 5 methylene groups in the aliphatic hydrocarbon group may be independently replaced by a structure selected from the group consisting of —O—, —CO—, —N($R^6$)—, —N($R^7$)CO—, and —CON($R^8$)—, wherein each of $R^6$, $R^7$, and $R^8$ independently represents a hydrogen atom or a $C_{1-6}$ alkyl group, wherein the total number of carbon atoms in the $R^1R^2R^3Si$ group is 18 to 80, and the $R^1R^2R^3SiCH_2CH_2$ group is bonded to the C-terminus of the amino acid or peptide residue in Y;

and (2) causing condensation of an N-protected amino acid or an N-protected peptide and the N-terminus of the C-protected amino acid or C-protected peptide obtained in the step (1).

3. The method according to claim 2, wherein at least one of the $R^1$, $R^2$, and $R^3$ is an aliphatic hydrocarbon group which may have a substituent in which one methylene group in the aliphatic hydrocarbon group may be replaced by —O—, and 3 or more carbon atoms in the aliphatic hydrocarbon group are tertiary or quaternary carbon atoms.

4. The method according to claim 1, wherein the aliphatic hydrocarbon group in the aliphatic hydrocarbon group which may have a substituent, in which one methylene group in the aliphatic hydrocarbon group may be replaced by —O—, and 3 or more carbon atoms in the aliphatic hydrocarbon group are tertiary or quaternary carbon atoms, is a $C_{15-40}$ alkyl group.

5. The method according to claim 1, wherein each of the $R^1$ and $R^2$ is independently a $C_{1-6}$ alkyl group.

6. The method according to claim 1, wherein each of the $R^1$ and $R^2$ is independently a phenyl group which may have a substituent.

7. The method according to claim 6, wherein the $R^1$ and $R^2$ are a phenyl group.

8. The method according to claim 1, wherein at least one of the $R^1$, $R^2$, and $R^3$ is an aromatic hydrocarbon group, in which the aromatic hydrocarbon group is substituted with a $C_{15-40}$ alkoxy group.

9. The method according to claim 8, wherein each of the $R^1$ and $R^2$ is independently a $C_{1-6}$ alkyl group.

10. The method according to claim 8, wherein each of the $R^1$ and $R^2$ is independently a phenyl group which may have a substituent.

11. The method according to claim 10, wherein the $R^1$ and $R^2$ are a phenyl group.

12. The method according to claim 1, wherein the $R^3$ is the following formula (II):

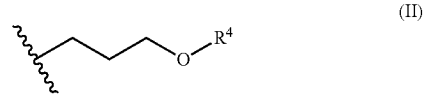

(II)

wherein $R^4$ represents a $C_{15-20}$ alkyl group.

13. The method according to claim 9, wherein the $R^3$ is the following formula (II'):

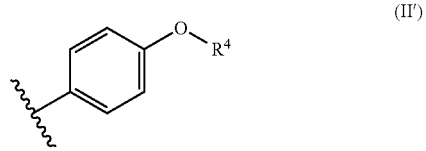

(II')

wherein $R^4$ represents a $C_{15-20}$ alkyl group.

14. The method according to claim 12, wherein 3 or more carbon atoms in the $R^4$ are tertiary or quaternary carbon atoms.

15. The method according to claim 14, wherein the $R^1R^2R^3Si$ group is the following formula (III):

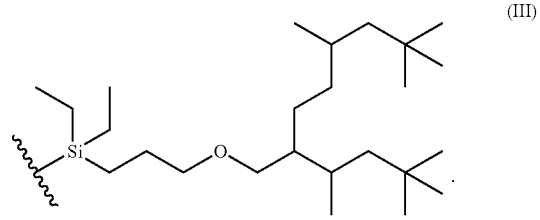 [SMILES: *[Si](CC)(CC)CCCOCC(CCC(C)CC(C)(C)C)C(C)CC(C)(C)C]

(III)

16. The method according to claim 14, wherein the $R^1R^2R^3Si$ group is the following formula (III'):

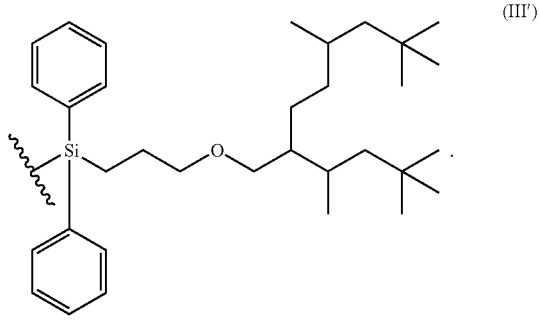 [SMILES: *[Si](CCCOCC(CCC(C)CC(C)(C)C)C(C)CC(C)(C)C)(c1ccccc1)c1ccccc1]

(III')

17. The method according to claim 14, wherein the $R^1R^2R^3Si$ group is the following formula (III''):

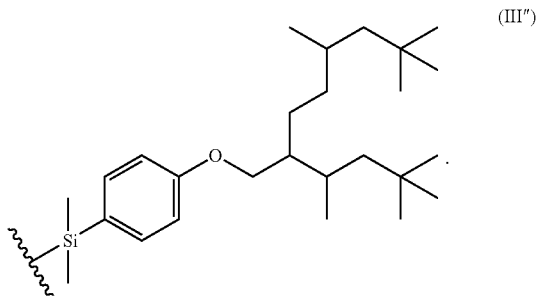 [SMILES: *[Si](C)(C)c1ccc(OCC(CCC(C)CC(C)(C)C)C(C)CC(C)(C)C)cc1]

(III″)

18. The method according to claim 1, further comprising the step of removing the C-terminal protective group of the peptide obtained in the step (2).

19. The method according to claim 1, further comprising the step of removing the C-terminal protective group of the peptide obtained in the step (2) using a fluorinating agent.

20. The method according to claim 1, wherein the total number of carbon atoms in the $R^1R^2R^3Si$ group is 20 to 80.

21. The method according to claim 1, wherein the total number of carbon atoms in the $R^1R^2R^3Si$ group is 20 to 40.

22. The method according to claim 1, wherein the N-terminal protective group of the N-protected amino acid or N-protected peptide is a benzyloxycarbonyl group, a 9-fluorenylmethoxycarbonyl group, or a t-butoxycarbonyl group.

23. The method according to claim 1, wherein the amino acid or peptide comprises an α-amino acid.

24. A compound represented by the following formula (IV):

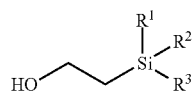

(IV)

wherein each of $R^1$ and $R^2$ independently represents a $C_{1-6}$ alkyl group, and $R^3$ represents an aliphatic hydrocarbon group which may have a substituent in which each of 1 to 5 methylene groups in the aliphatic hydrocarbon group may be independently replaced by a structure selected from the group consisting of —O—, —CO—, —N(R$^6$)—, —N(R$^7$)CO—, and —CON(R$^8$)—, and 3 or more carbon atoms in the aliphatic hydrocarbon group are tertiary or quaternary carbon atoms, wherein each of $R^6$, $R^7$, and $R^8$ independently represents a hydrogen atom or a $C_{1-6}$ alkyl group, wherein the total number of carbon atoms in the $R^1R^2R^3Si$ group is 18 to 80.

25. A compound represented by the following formula (IV):

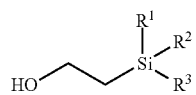

(IV)

wherein $R^1$ and $R^2$ represent a phenyl group, and $R^3$ represents an aliphatic hydrocarbon group which may have a substituent in which each of 1 to 5 methylene groups in the aliphatic hydrocarbon group may be independently replaced by a structure selected from the group consisting of —O—, —CO—, —N(R$^6$)—, —N(R$^7$)CO—, and —CON(R$^8$)—, and 3 or more carbon atoms in the aliphatic hydrocarbon group are tertiary or quaternary carbon atoms, wherein each of $R^6$, $R^7$, and $R^8$ independently represents a hydrogen atom or a $C_{1-6}$ alkyl group, wherein the total number of carbon atoms in the $R^1R^2R^3Si$ group is 18 to 80.

26. The compound according to claim 24, wherein the aliphatic hydrocarbon group in the aliphatic hydrocarbon group which may have a substituent, in which each of 1 to 5 methylene groups in the aliphatic hydrocarbon group may be independently replaced by a structure selected from the group consisting of —O—, —CO—, —N(R$^6$)—, —N(R$^7$)CO—, and —CON(R$^8$)—, and 3 or more carbon atoms in the aliphatic hydrocarbon group are tertiary or quaternary carbon atoms, is a $C_{15-40}$ alkyl group.

27. A compound represented by the following formula (IV):

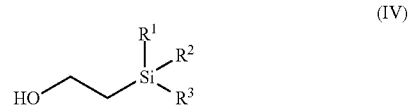

(IV)

wherein each of $R^1$ and $R^2$ independently represents a $C_{1-6}$ alkyl group or a phenyl group, and $R^3$ represents a phenyl group in which the phenyl group is substituted with a $C_{15-40}$ alkoxy group, wherein the total number of carbon atoms in the $R^1R^2R^3Si$ group is 18 to 80.

28. The compound according to claim 24, wherein the $R^3$ is the following formula (II):

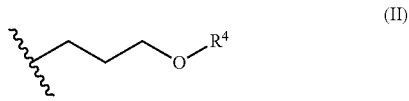

(II)

wherein $R^4$ represents a $C_{15-20}$ alkyl group.

29. The compound according to claim 27, wherein the $R^3$ is the following formula (II'):

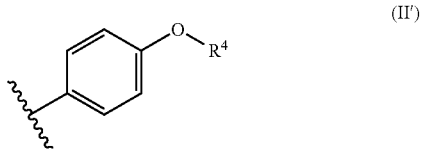

(II')

wherein $R^4$ represents a $C_{15-20}$ alkyl group.

30. The compound according to claim 28, wherein 3 or more carbon atoms in the $R^4$ are tertiary or quaternary carbon atoms.

31. The compound according to claim 24, wherein the total number of carbon atoms in the $R^1R^2R^3Si$ group is 20 to 40.

32. A compound represented by the following formula (V):

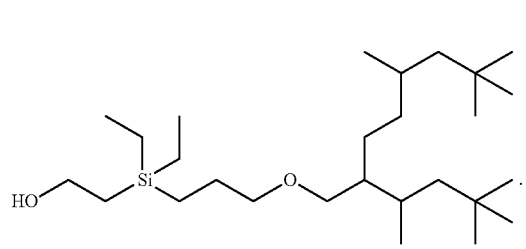
(V)
33. A compound represented by the following formula (V'):
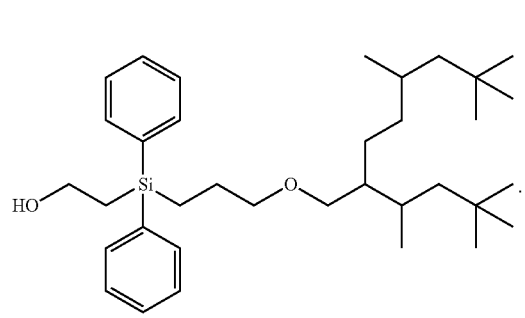
(V')
34. A compound represented by the following formula (V''):
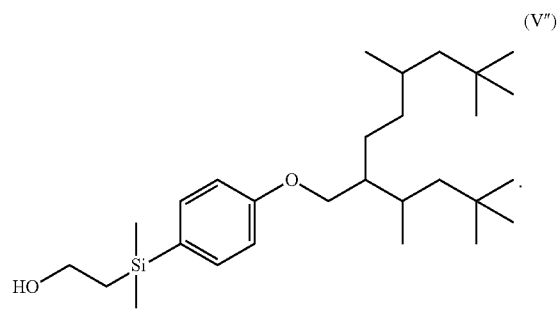 [SMILES: CC(CCC(COc1ccc([Si](C)(C)CCO)cc1)C(C)CC(C)(C)C)CC(C)(C)C]
(V'')
35. A compound represented by the following formula (V'''):
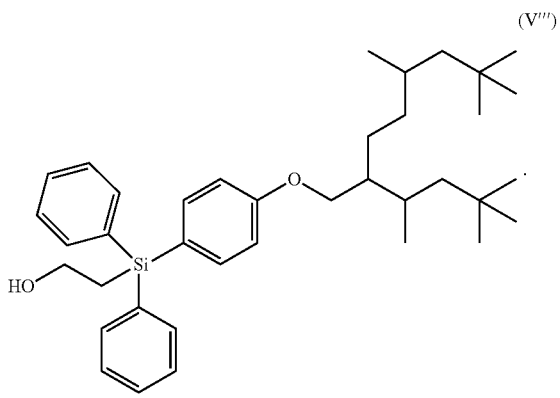 [SMILES: CC(CCC(COc1ccc([Si](CCO)(c2ccccc2)c2ccccc2)cc1)C(C)CC(C)(C)C)CC(C)(C)C]
(V''')
36. A reagent for protecting a carboxy group in an amino acid or a peptide, the reagent comprising the compound according to claim 24.
* * * * *